United States Patent [19]
Kikkawa et al.

[11] Patent Number: 6,080,370
[45] Date of Patent: *Jun. 27, 2000

[54] WET-TYPE FLUE GAS DESULFURIZATION PLANT AND METHOD MAKING USE OF A SOLID DESULFURIZING AGENT

[75] Inventors: Hirofumi Kikkawa; Fumito Nakajima; Hiroyuki Kaku; Shigehito Takamoto; Hiroshi Ishizaka; Shigeru Nozawa; Masakatsu Nishimura, all of Kure; Takanori Nakamoto, Tokyo, all of Japan

[73] Assignee: Babcock-Hitachi Kabushiki Kaisha, Japan

[ * ] Notice: This patent is subject to a terminal disclaimer.

[21] Appl. No.: 09/207,152

[22] Filed: Dec. 8, 1998

Related U.S. Application Data

[62] Division of application No. 08/898,850, Jul. 25, 1997, Pat. No. 5,945,081, which is a continuation of application No. 08/532,759, filed as application No. PCT/JP95/00921, May 11, 1995, Pat. No. 5,686,053.

[30] Foreign Application Priority Data

| May 11, 1994 | [JP] | Japan | 6-97425 |
| Feb. 8, 1995 | [JP] | Japan | 7-20625 |
| Feb. 28, 1995 | [JP] | Japan | 7-40315 |
| Feb. 28, 1995 | [JP] | Japan | 7-40316 |
| Feb. 28, 1995 | [JP] | Japan | 7-40318 |

[51] Int. Cl.⁷ ............... B01D 53/50; B01D 53/78
[52] U.S. Cl. ............ 422/168; 422/171; 422/215; 422/225; 422/234
[58] Field of Search ............... 422/168–172, 422/177, 215, 225, 234; 423/243.01, 243.08, DIG. 5

[56] References Cited

U.S. PATENT DOCUMENTS

| 4,696,805 | 9/1987 | Shinoda et al. | 423/242 |
| 5,686,053 | 11/1997 | Kikkawa et al. | 423/243.01 |
| 5,788,944 | 8/1998 | Kikkawa et al. | 423/243.01 |
| 5,945,081 | 8/1999 | Kikkawa et al. | 423/243.01 |

*Primary Examiner*—Hien Tran
*Attorney, Agent, or Firm*—Lorusso & Loud

[57] ABSTRACT

A wet-type flue gas desulfurization method and plant making use of a solid desulfurizing agent in which exhaust gas exhausted from a combustion apparatus such as a boiler is brought into contact with absorbing liquid to absorb sulfur oxide from the exhaust gas into the absorbing liquid followed by neutralization of the absorbing liquid containing the sulfur oxide thus absorbed. The solid desulfurizing agent is selectively retained in an absorbing liquid neutralizing zone and the absorbing liquid, containing water as a main constituent and solid products formed from the absorbed sulfur oxide, is selectively removed from the neutralizing zone. In the neutralizing zone the upward flow of the absorbing liquid, optionally augmented by an upward flow of air or water, forms a fluidized bed of limestone particles, thereby preventing coating of the limestone by gypsum and thereby retaining reactivity of limestone. According to the present invention, coexistence of Al and F in the absorbing liquid seldom deteriorates the desulfurizing performance. Further, it is possible to reduce power and cost required to grind limestone and to achieve a higher desulfurizing performance.

10 Claims, 39 Drawing Sheets

(a)  (b)  (c)

WET-TYPE FLUE GAS DESULFURIZATION PLANT AND METHOD MAKING USE OF A SOLID DESULFURIZING AGENT

CROSS-REFERENCE TO RELATED APPLICATIONS

This application is a division of U.S. application Ser. No. 08/898,850, filed Jul. 25, 1997, now U.S. Pat. No. 5,945,081. U.S. application Ser. No. 08/898,850 is a continuation of U.S. application Ser. No. 08/532,759 filed Oct. 11, 1995, now U.S. Pat. No. 5,686,053, which is a national stage filing under 35 USC 371 of application Number PCT/JP95/00921 filed on May 11, 1995.

INDUSTRIAL FIELD

This invention relates to a wet-type flue gas desulfurization plant and method making use of a solid desulfurizing agent, and more particularly, to a wet-type flue gas desulfurization plant and method making use of a solid desulfurizing agent for economically removing sulfur oxides in flue gas exhausted from combustion equipment, such as boilers, with higher desulfurization performance, decreased power for grinding solid desulfurizing agents such as limestone and for ameliorating the affect on desulfurization performance due to aluminum and fluorine components in the absorbent.

PRIOR ART

Sulfur oxides (hereinafter simply referred to as $SO_2$) in flue gas generated as a result of combustion of fossil fuel in thermal power plants, etc., is a main cause of global environmental problems such as air pollution, acid rain and the like. Thus, studies on flue gas desulfurization methods to remove $SO_2$ therefrom and development of flue gas desulfurization plants have become important.

Although various processes have been proposed for flue gas desulfurization, the wet-type is the major process. The wet-type processes include methods using sodium, calcium and magnesium compounds as an absorbent, respectively. The sodium method above all is excellent in reactivity between the absorbent and $SO_2$, but the sodium compounds used are very expensive. For this reason the calcium method using relatively cheaper calcium compounds such as calcium carbonate is most widely employed as a-flue gas desulfurization system for large boilers in power plants.

The desulfurization methods using such calcium compounds in the absorbent liquid are generally classified into spraying, wetted wall and bubbling systems, depending on the particular gas-liquid contacting method. While each system has outstanding characteristic features independently, the spraying system is considerably popular and reliable, and is thus the most widely used worldwide. The conventional spraying desulfurization system once comprised three towers, i.e., a cooling tower for cooling and dust-removal treatment of the exhaust gas, a desulfurization tower for spraying absorbent liquid into the exhausted gas for reaction with $SO_2$ and a oxidation tower for oxidizing calcium sulfite formed in the desulfurization tower. Recently, a mono-tower desulfurization system (an in-tank oxidizing method) in which the desulfurization tower provides both cooling and oxidation functions has been developed and is now becoming the most popular spraying system.

FIG. 39 shows an example of a conventional spraying mono-tower desulfurization plant. In general, such a mono-tower desulfurization system comprises a tower body 1, an inlet duct 2, an outlet duct 3, a spray nozzle 4, an absorbent pump 5, a circulation tank 6, a stirrer 7, an air blower 8, a mist eliminator 9, an absorbent draining pipe 10, a gypsum draining pipe 11, a limestone supplying pipe 12, a hydroextractor 13 and the like. Several spray nozzles 4 are arranged in each of a number of horizontal arrays and several stages of these horizontal arrays are vertically spaced. The stirrer 7 and the air blower 8 are connected to the circulation tank 6 located in the bottom of the desulfurization tower where the absorbing liquid collects, while the mist eliminator 9 is arranged at an uppermost portion of the desulfurization tower or in the outlet duct 3.

Exhaust gas A exhausted from a boiler is introduced to the desulfurization tower body 1 from the inlet duct 2 and exhausted through the outlet duct 3. During such a process, the absorbing liquid is pumped from the absorbing liquid pump 5 through the absorbing liquid draining pipe 10 and is sprayed from a plurality of nozzles 4 for gas-liquid contact of the absorbing liquid with the exhaust gas A. Upon spraying, $SO_2$ is selectively absorbed by the absorbing liquid from the exhaust gas A to form calcium sulfite. The absorbing liquid containing the thus formed calcium sulfite is collected in the circulation tank 6 where, with agitation by means of the stirrer 7, calcium sulfite in the absorbing liquids is oxidized by air B supplied by the air blower 8 to form gypsum C. A desulfurizing agent such as limestone D is added to the absorbing liquid in the circulation tank 6 through the limestone supplying pipe 12. A portion of the absorbing liquid in the circulation tank 6, wherein limestone D and gypsum C coexist, is once again pumped by the absorbing liquid pump 5 to the spray nozzle 4 through the absorbing liquid draining pipe 10, while an another portion thereof is pumped to the-dehydrator 13 through the gypsum draining pipe 11. Smaller droplets of the absorbing liquid sprayed out of and atomized by the spray nozzle 4 are entrained with the exhaust gas A and collected by the mist eliminator 9 located in an upper portion of the desulfurization tower.

Problems inherent in the prior art as described above include the following:

(1) The absorbing liquid contains not only calcium carbonate (limestone) which absorbs $SO_2$ but also a considerable amount of gypsum which makes no contribution to the absorption. When the proportion of the limestone in the absorbing liquid is increased so as to improve the desulfurization performance, then the quality of gypsum is decreased to a useless level.

(2) Considerable power energy is consumed to grind the limestone.

(3) When aluminum and fluorine compounds coexist in the absorbing liquid, inactive compounds containing aluminum and fluorine are formed on the surfaces of the limestone particles, which decreases the desulfurization performance.

Accordingly, it is an object of the present invention to provide a flue gas desulfurization plant and method in order to solve conventional problems as described above and to economically achieve higher desulfurization performance.

Another object of the present invention is to provide a flue gas desulfurization plant and method capable of increasing desulfurization performance without decreasing the quality of solid products made by reaction with a solid desulfurizing agent.

Still another object of the present invention is to provide a flue gas desulfurization plant and method with higher desulfurization performance capable of reducing power cost for grinding a solid desulfurizing agent.

A further object of the present invention is to provide a flue gas desulfurization plant and method with higher desulfurization performance capable of easily separating a solid desulfurizing agent contained in absorbing liquid from the solid products formed by reaction of the solid desulfurizing agent.

These and other objects of the present invention will be described in the following.

DISCLOSURE OF THE INVENTION

To achieve the above described objects, according to a first aspect and feature of the present invention, there is provided a wet-type flue gas desulfurization method making use of a solid desulfurizing agent in which exhaust gas exhausted from a combustion apparatus such as a boiler is brought into contact with absorbing liquid to absorb sulfur oxide from the exhaust gas into the absorbing liquid, followed by neutralization of the absorbing liquid containing the sulfur oxide thus absorbed, which method involves selectively leaving the solid desulfurizing agent in an absorbing liquid neutralizing zone and selectively removing the absorbing liquid, containing water as a main constituent and solid products formed by the sulfur oxide, from said neutralizing zone.

Further, there is provided a wet-type flue gas desulfurization method making use of a solid desulfurizing agent in which exhaust gas exhausted from a combustion apparatus such as a boiler is brought into contact with absorbing liquid to absorb sulfur oxide from the exhaust gas into the absorbing liquid, which comprises oxidizing the absorbing liquid after the sulfur oxide is absorbed therein, neutralizing thus oxidized absorbing liquid by reaction with a solid desulfurizing agent which is selectively left in a neutralizing zone, selectively removing solid products formed from sulfur oxide and the absorbing liquid containing water as a main constituent and once again contacting the thus separated absorbing liquid containing water as a main constituent with the exhaust gas.

There is also provided a wet-type flue gas desulfurization plant making use of a solid desulfurizing agent in which exhaust gas exhausted from a combustion apparatus such as a boiler is brought into contact with absorbing liquid to absorb sulfur oxide from the exhaust gas into the absorbing liquid followed by neutralization of the absorbing liquid containing the sulfur oxide thus absorbed, which comprises an absorbing liquid neutralizing zone for selectively retaining the solid desulfurizing agent and selectively removing the absorbing liquid containing water as a main constituent and the solid products formed by reaction with the sulfur oxide.

Furthermore, there is provided a wet-type flue gas desulfurization plant making use of a solid desulfurizing agent in which exhaust gas exhausted from a combustion apparatus such as a boiler is brought into contact with absorbing liquid to absorb sulfur oxide from the exhaust gas into the absorbing liquid, which comprises an absorbing zone for contacting the absorbing liquid with the exhaust gas to absorb the sulfur oxide from the exhaust gas into the absorbing liquid, an oxidizing zone for oxidizing the absorbing liquid containing the sulfur oxide thus absorbed, a neutralizing zone for neutralizing said oxidized absorbing liquid by contact with a desulfurizing agent, selectively retaining the solid desulfurizing agent and selectively removing the absorbing liquid, containing water as a main constituent and solid product formed from the sulfur oxide, and a circulation channel for the absorbing liquid for returning the absorbing liquid containing water and the solid products formed from the sulfur oxide to the absorbing zone.

The solid desulfurizing agent used in the present invention preferably has a weight-average particle diameter (hereinafter referred to as "average particle diameter") of more than 0.5 mm. An average particle diameter less than 0.5 mm would make it difficult to separate the desulfurizing agent from oxidization reaction products such as gypsum. More preferably, the solid desulfurizing agent has an average particle diameter more than 1.0 mm. The solid desulfurizing agent having an average particle diameter more than 10 mm would decrease reactivity in neutralization of the absorbing liquid containing absorbed $SO_2$ and, in addition, would wear the supplying pipe which is connected to a neutralizing zone of the flue gas desulfurization plant. Accordingly, the solid desulfurizing agent used in the present invention desirably has an average particle diameter of 0.5 mm to 10 mm. However, the present solid desulfurizing agent may contain particles of a size 0.5 mm or less, because the range for desirable average particle diameter is not a strict standard.

Exhaust gas contains many kinds of fine particulate components and, especially in the case of coal-fired boilers, a large amount of combustion ashes. Such combustion ashes are substantially removed by means of a dust collector upstream of the desulfurization plant but are partially passed into the desulfurization plant and captured by the sprayed absorbing liquid. The combustion ashes contain an aluminum component (Al) a part of which dissolves in the absorbing liquid when $SO_2$ is absorbed therein to decrease pH thereof. On the other hand, hydrogen fluoride (HF) contained in the exhaust gas is captured by the sprayed absorbing liquid and, in the presence of the Al component described above, reacted with limestone to form aluminum-fluorine containing compounds, typically represented by the chemical formula: $CaAlF_3(OH)_2CaF_2$. Such compounds are deposited on surfaces of the limestone particles to decrease the reactivity of the limestone. The inventors have found that this reaction has no connection with particle diameter of the limestone particles. It has been also found, however, that the aluminum-fluorine containing compound can be removed from limestone having an average particle diameter of more than 0.5 mm when the limestone particles are mutually contacted and abraded in the neutralizing zone. Finer limestone particles suspend in the absorbing liquid.

It is desirable in the present invention to supply the solid desulfurizing agent in a form of slurry or in a dry form by an air-conveying method.

The amount of the solid desulfurizing agent supplied to the neutralizing zone is controlled by a fixed quantity feeder or on-off operation of a grinder for the solid desulfurizing agent, while particle size of the solid desulfurizing agent is controlled by regulating speed of the grinder, etc.

Limestone is a typical example of the solid desulfurizing agent used in the present invention. The "limestone" used herein means a sedimentary rock containing calcium carbonate as a main component and further includes such rock additionally containing magnesium carbonate. Accordingly, dolomite which contains $CaCO_3$ and $MgCO_3$ as main components is also included in the "limestone" used herein. While the limestone contains impurities which affect desulfurization reactivity, it is desirable that $CaCO_3$ having higher reactivity be exposed on the solid surfaces by grinding the limestone. However, because the solid desulfurizing agent of finer particle size is easily included in the solid products such as gypsum, such finer particles should be separated and removed prior to use even though they have higher reactivity. On the other hand, excessively large particles would damage the solid desulfurizing agent supplying zone and it is desirable that the supplying zone be provided with a filter or a cyclone to classify the solid desulfurizing agent.

Principal reactions which occur in the flue gas desulfurization plant according to the present invention are represented by the following. The following reaction formulas (1) to (3) are shown as typical reactions for better understanding of the present invention and it is believed that the reactions occurring in the present flue gas desulfurization system may or may not always conform to the formulas (1) to (3).

The following reactions (1) to (3) describe an embodiment in which limestone ($CaCO_3$) is used as a solid absorbing agent. The absorbing liquid (which contains water as a main constituent) absorbs $SO_2$ in the exhaust gas to form $H_2SO_3$ which is then oxidized by air to yield $H_2SO_4$ (dilute sulfuric acid). $H_2SO_4$ is neutralized by $CaCO_3$ to form gypsum ($CaSO_4 \cdot 2H_2O$).

(Absorbing Reaction) $H_2O + SO_2 = H_2SO_3$     (1)

(Oxidation Reaction) $H_2SO_3 + 1/2 O_2 = H_2SO_4$     (2)

(Neutralization Reaction) $H_2SO_4 + CaCO_3 + H_2O = CaSO_4 \cdot 2H_2O + CO_2$     (3)

Gypsum thus formed is collected and used as an industrial material such as a gypsum board. Inclusion of a considerable amount of limestone in the gypsum deteriorates quality of the product. Thus, in conventional flue gas desulfurization plants, it has been necessary that the concentration of limestone in the absorbing liquid be at a level under a predetermined value (e.g., about 1/100 of gypsum). It is possible to treat the absorbing liquid containing gypsum and limestone by means of a classifier such as a wet cyclone in order to selectively collect gypsum in the absorbing liquid. However, such a classification is not very effective because the difference in diameter between limestone and gypsum particles used in the conventional flue gas desulfurization plant is small and, in addition, classifying devices are expensive.

According to the present invention, the limestone particles are selectively retained in a neutralizing zone and water and the gypsum formed from the sulfur oxide are selectively removed from the system. This enables improvement in the desulfurization performance while maintaining the quality of the gypsum. In practice of the present invention, limestone used to neutralize the absorbing liquid which absorbs $SO_2$ from the exhaust gas has a weight-average diameter of at least 0.5 mm, and preferably 1.0 mm or more, thereby enabling easy separation of limestone and gypsum (having a normal weight-average diameter of 30 to 100 $\mu$m).

Further, according to the present invention, because limestone of a relatively larger particle diameter is used, finer grinding thereof is not necessary, thereby eliminating need for fine grinders and saving power otherwise required for grinding.

It is possible in the present invention to load limestone into the neutralizing zone in an amount sufficient to provide what is spent during a continuous run for about 20 hours under standard conditions. It is thus a feature of the present invention that precise control of supply of limestone to the neutralizing zone is not required even when load of the exhaust gas increases and pH value of the absorbing liquid markedly decreases.

The reaction of formula (3) proceeds on the surface of the limestone particles in the neutralizing zone. Continuous contact of the absorbing liquid containing $H_2SO_4$ with the limestone particles promotes the reaction (3) and increases the desulfurizing performance. When the absorbing liquid flows from top down through a limestone layer, the limestone layer is tightened to form regions where the absorbing liquid flows slowly or not at all, while the desulfurizing performance decreases. In order to solve such a problem of tightening of the limestone layer, for example, the absorbing liquid is passed at a certain speed or faster from the bottom upward through the limestone layer in the neutralizing zone to fluidize the limestone particles, thereby increasing the desulfurizing performance.

As it is difficult to determine height of the limestone layer and fluidized condition of the limestone for a given level of neutralization in the present invention, although a fluidized bed of the limestone layer is formed, there is the possibility that the absorbing liquid will selectively flow to a portion of the layer having a lower height. Further, when the amount of the absorbing liquid circulating through an area contacted with the exhaust gas is unchanged, if the absorbing liquid flows mainly to a portion of lower height in the limestone layer (a portion containing a lesser amount of limestone), the proportion of limestone to the absorbing liquid is extremely decreased. This results in a decrease not only in the pH of the absorbing liquid fed to the area of contact with the exhaust gas but also in the desulfurizing performance.

It is possible to substantially level (or even) the height of the limestone layer as a whole in the neutralizing zone and thus to prevent the decrease in the desulfurizing performance by employing one of the following techniques: blowing gas such as air into the limestone layer in the neutralizing zone, jetting liquid such as water into the limestone layer or stirring the limestone by means of a stirring device. It is also possible to level (or make even) the height of the limestone layer as a whole in the neutralizing zone by, instead of simply blowing gas into the limestone layer, blowing the gas toward a portion where the absorbing liquid is jetted from the bottom upward in the neutralizing zone to feed the gas together with the absorbing liquid into the limestone layer. Stirring devices for the limestone layer suitable for use herein include a stirrer provided with stirring blades or rakes in the neutralizing zone, an apparatus for rotating the neutralizing zone itself and the like.

More preferably, leveling of the height of the limestone layer as a whole in the neutralizing zone is conducted by employing more than one of the following techniques: first of all, detecting fluidizing condition of limestone in plural spots by determining more than one factor selected from a group consisting of pressure loss across the limestone layer in plural fluidizing spots, solids concentration, specific gravity and viscosity of the absorbing liquid (the pressure drop decreases in poorly fluidizing spots), followed by blowing gas such as air or jetting liquid such as water into the limestone layer in spots where the fluidizing condition is poor, or stirring limestone by means of a stirring device.

Pressure drop P across a portion of a fluidized bed is generally expressed by the following formula:

$P$=(gravity of limestone−gravity of absorbing liquid)×(height of limestone layer)×(1−void)

The void in the above formula is a value under a fluidizing condition; however, the product of (height of limestone layer)×(1−void) is equivalent under stationary and fluidizing conditions, and accordingly, height of the limestone layer under a stationary condition can be determined by the formula above. That is, because gravity of limestone is known (about 2.7) and the void under a stationary condition is about 0.4, although it depends on particle shape, the height of the limestone layer is obtainable from determination or pressure loss P and gravity of the absorbing liquid. Further, as gravity of the absorbing liquid correlates with particle concentration (substantially gypsum particle concentration) or viscosity of the absorbing liquid, such concentration or viscosity may be determined instead of the gravity.

Mixing of the limestone particles in the absorbing liquid is promoted and contacting effect of these components is increased by: blowing gas such as air into the limestone layer, jetting liquid into the limestone layer or stirring the limestone by means of a stirring device.

Further, a part of $CO_2$ dissolved in the absorbing liquid is expelled to promote the neutralizing reaction and improve the desulfurizing performance by blowing a gas other than $CO_2$, such as air, into the limestone layer.

The present invention is also applicable to a flue gas desulfurization plant provided with an external oxidizing tower. This type of flue gas desulfurization plant comprises a cooling tower for cooling of and dust removal from an exhaust gas, a desulfurizing tower for spraying an absorbing liquid for reaction with $SO_2$ in the exhaust gas and an oxidizing tower for oxidizing calcium sulfite formed in the desulfurizing tower. Principal reactions occurring in the desulfurization plant provided with an external oxidizing tower according to the present invention are given below.

The absorbing liquid (containing water as a main constituent) absorbs $SO_2$ in the exhaust gas to form sulfurous acid ($H_2SO_3$) followed by reaction with calcium sulfite ($CaSO_3 \cdot \frac{1}{2}H_2O$) to yield calcium hyposulfite ($Ca(HSO_3)_2$). Then, the calcium hyposulfite is reacted with limestone in a neutralizing zone to form calcium sulfite. The product calcium sulfite is recycled to an absorbing zone to react with $H_2SO_3$ which has been formed by absorbing $SO_2$ in the exhaust gas. On the other hand, a part of calcium sulfite is fed to the oxidizing tower, where sulfuric acid is subsequently added to adjust the pH value thereof. Finally, the calcium sulfite is oxidized to form gypsum ($CaSO_4 \cdot 2H_2O$).

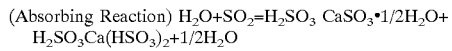
(Absorbing Reaction) $H_2O+SO_2=H_2SO_3$ $CaSO_3 \cdot 1/2H_2O+ H_2SO_3 Ca(HSO_3)_2+1/2H_2O$

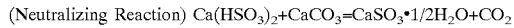
(Neutralizing Reaction) $Ca(HSO_3)_2+CaCO_3=CaSO_3 \cdot 1/2H_2O+CO_2$

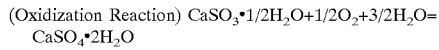
(Oxidization Reaction) $CaSO_3 \cdot 1/2H_2O+1/2O_2+3/2H_2O= CaSO_4 \cdot 2H_2O$

BEST MODE FOR CARRYING OUT THE INVENTION

The present invention will now be described in detail by way of preferred embodiments.

EXAMPLE 1

Figure 1:
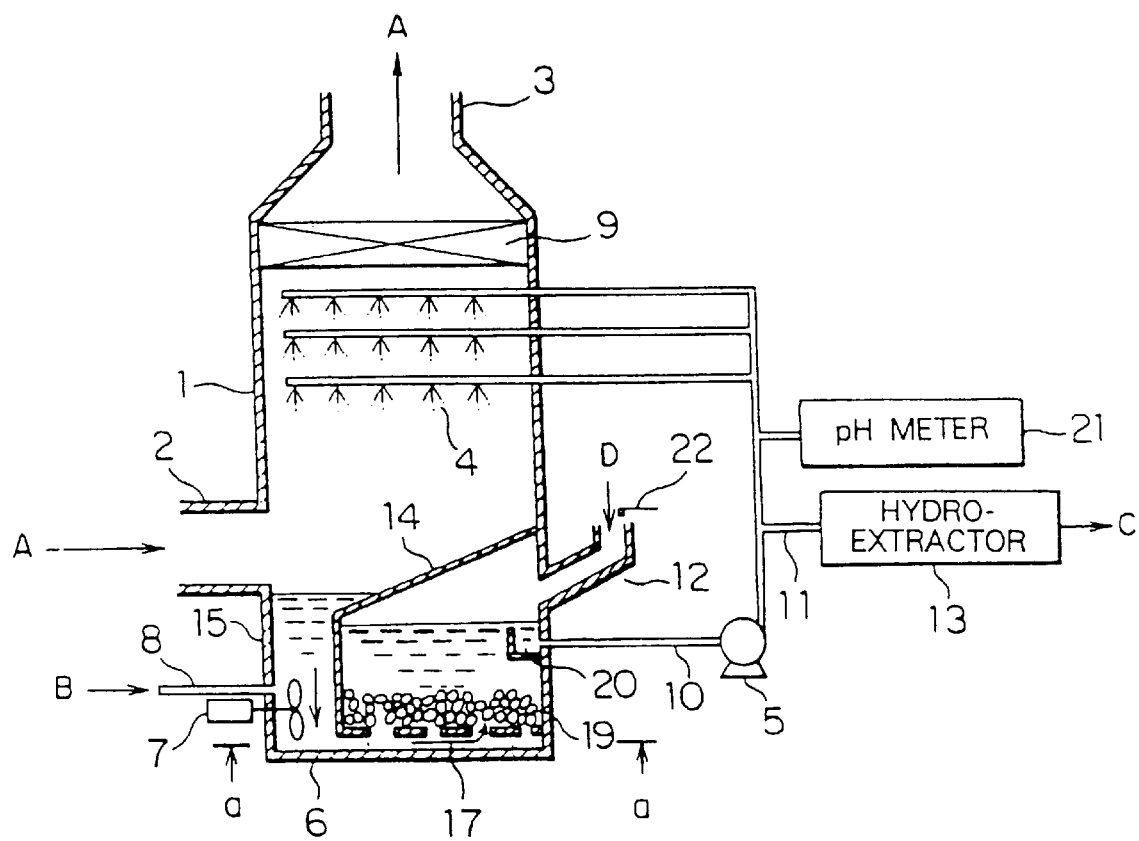
FIG. 1 is a schematic view of a mono-tower wet-type flue gas desulfurization plant according to Example 1 of the present invention.
Figure 2:
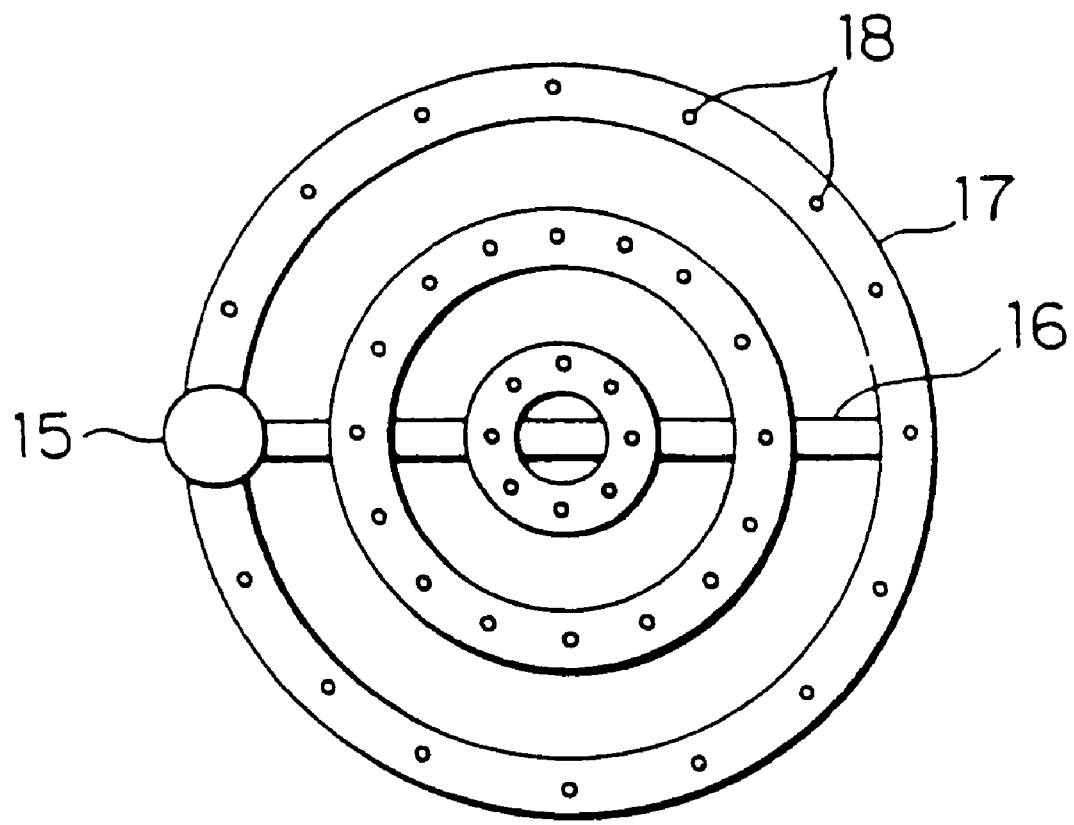
FIG. 2 is a sectional view taken on line a—a in FIG. 1.
Figure 39:
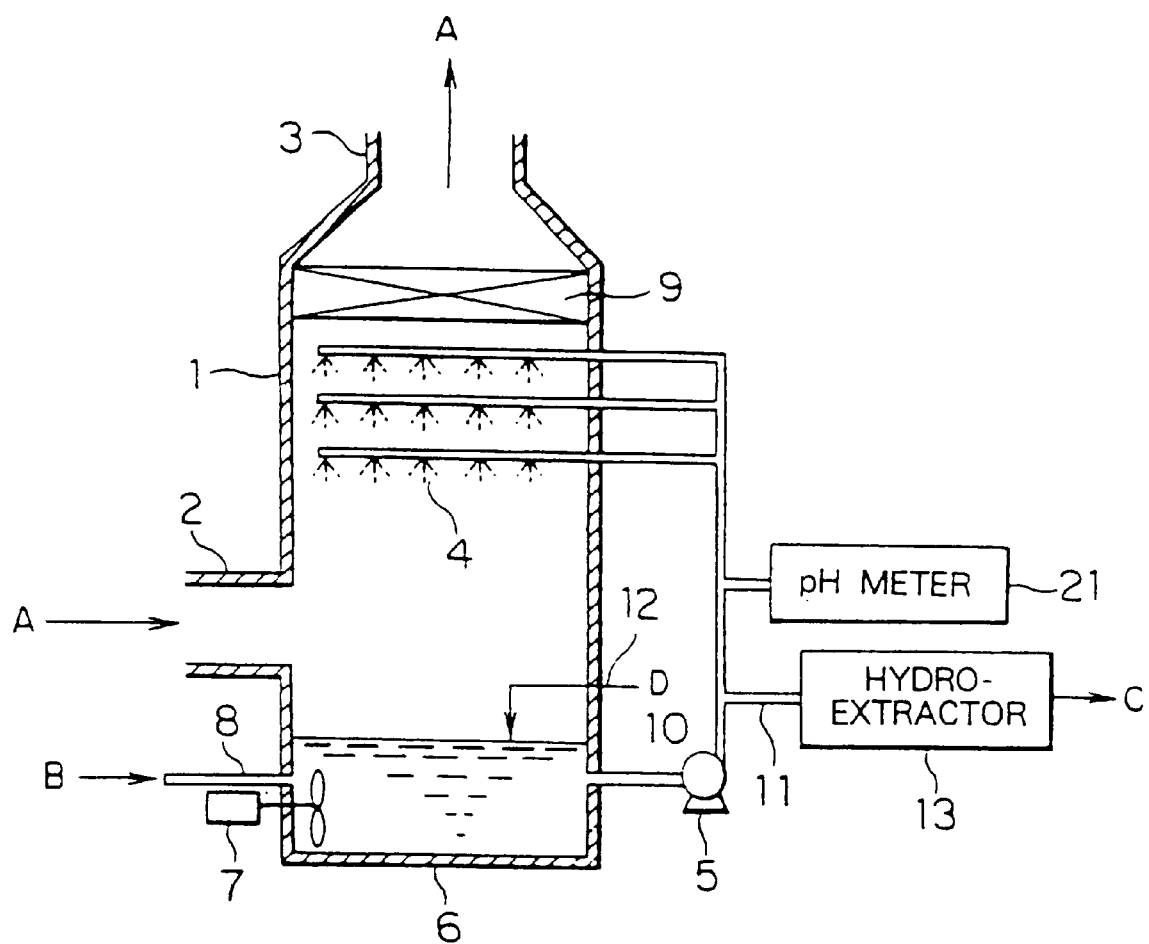
FIG. 39 is a schematic view of a conventional mono tower wet-type flue gas desulfurization plant.

This example is shown in FIG. 1 and FIG. 2, the latter being a sectional view taken on line a—a in FIG. 1. Similar to the conventional desulfurization tower as shown in FIG. 39, the plant in this Example comprises a tower body 1, an inlet duct 2, an outlet duct 3, a spray nozzle 4, an absorbing liquid pump 5, a circulation tank 6, a stirrer 7, an air blower 8, a mist eliminator 9 and the like, and is further provided with a liquid collecting plate. An introducing pipe 15 connects to a branch pipe 16 shown in FIG. 2 and to a dispersing pipe 17 in the circulation tank 6 for generating an upward flow through layer 19 of limestone particles loaded in a lower portion of the circulation tank 6 and for fluidizing the limestone particles in the absorbing liquid.

Exhaust gas A exhausted from a boiler (not shown) is introduced from the inlet duct 2 to the desulfurization tower body 1 and exits through the outlet duct 3. During this process, the absorbing liquid pumped by the absorbing liquid pump 5 is sprayed into the desulfurization tower through plural spray nozzles 4 for gas-liquid contact between the absorbing liquid and the exhaust gas A. Droplets of the absorbing liquid thereby selectively absorb $SO_2$ from the exhaust gas A to form sulfurous acid. The droplets of absorbing liquid containing sulfurous acid thus formed drop on the liquid collecting plate 14 arranged on the circulation tank 6. The absorbing liquid dropped on the collecting plate 14 is collected and led to the bottom of the circulation tank 6 through the introducing pipe 15. On the way, sulfurous acid in the absorbing liquid is oxidized to sulfuric acid by oxidizing air blown in from the air blowing device 8.

A dispersing pipe 17 is connected to the bottom of the introducing pipe 15, which allows the absorbing liquid to go upward in the circulation tank 6 homogeneously throughout a plane thereof. In FIG. 2, structure of the dispersing pipe 17 is illustrated. FIG. 2 is a bottom plan view of the circulation tank 6 provided with the dispersing pipe 17 which is designed to uniformly disperse the absorbing liquid upward from the bottom of the circulation tank 6 homogeneously throughout the plane thereof.

The dispersing pipe 17 has plural dispersing holes 18 through which the absorbing liquid and air are homogeneously and vigorously jetted throughout the plane of the circulation tank 6 to generate an upward flow thereof. Sulfuric acid and limestone are reacted to form gypsum in the limestone layer 19 which is fluidized in the absorbing liquid in the circulation tank 6. The pH value of the circulating absorbing liquid is continuously measured by a pH meter 21.

The absorbing liquid thus neutralized in the limestone layer 19 recovers a certain portion of its pH value and is again fed to the spray nozzles 4 from an outlet 20 in an upper portion of the circulation tank 6 through an absorbing liquid draining pipe 10 to selectively absorb $SO_2$ in the exhaust gas A—A part of the absorbing liquid is fed to a hydroextractor 13 to collect gypsum C.

Figure 3:
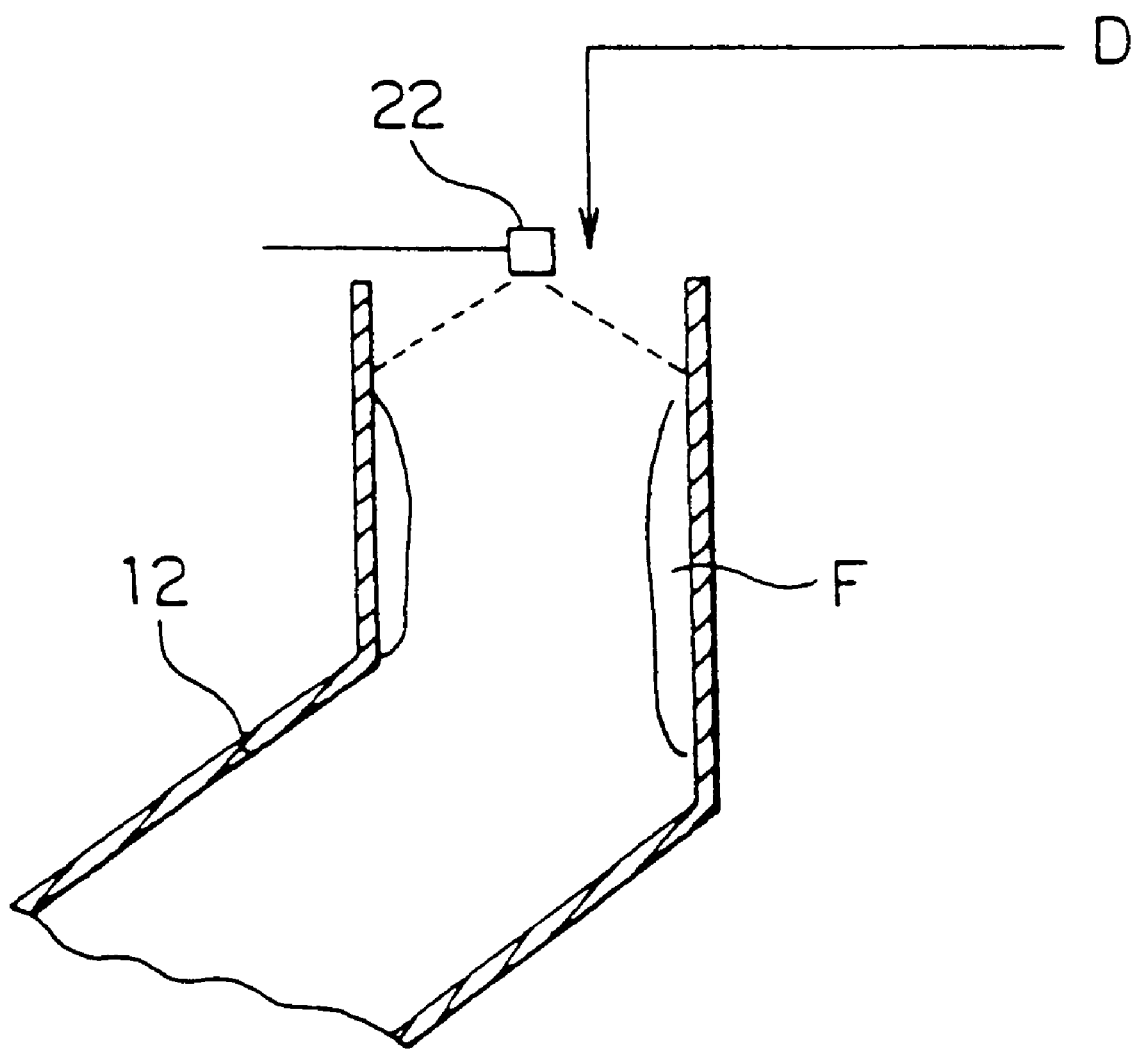
FIG. 3 is an enlarged view of a limestone supplying pipe in FIG. 1.

Limestone D is supplied to the circulation tank 6 through a limestone supplying pipe 12. Limestone particles are supplied as a slurry or in a dried form from the limestone supplying pipe 12. When dried limestone is supplied pneumatically to the tower through the limestone supplying pipe 12, the limestone is wetted and adheres as a deposit F on an inner wall surface of the supplying pipe 12 in consequence of vapor of the absorbing liquid as shown in FIG. 3, because the temperature in the circulation tank 6 is about 50° C. As a large quantity of the wetted limestone adhered on the wall would cause clogging of the limestone supplying pipe 12, it is desirable to provide a wash-water spray nozzle 22 for periodically washing the inner wall of the limestone supplying pipe 12 to remove the limestone deposits F. Such a wash-water spray nozzle 22 for periodically washing the inner wall of the limestone supplying pipe 12 to remove the limestone deposits F is desirably applied in all Examples which will be described below although it is not shown in the drawings.

When sulfuric acid and limestone are reacted in the fluidized limestone layer 19 to form gypsum, only gypsum particles and water are drained out of the circulation tank 6 through the outlet 20 located at the upper portion thereof because the gypsum particles are smaller than the limestone particles, and limestone is selectively left in the circulation tank 6.

Figure 4:
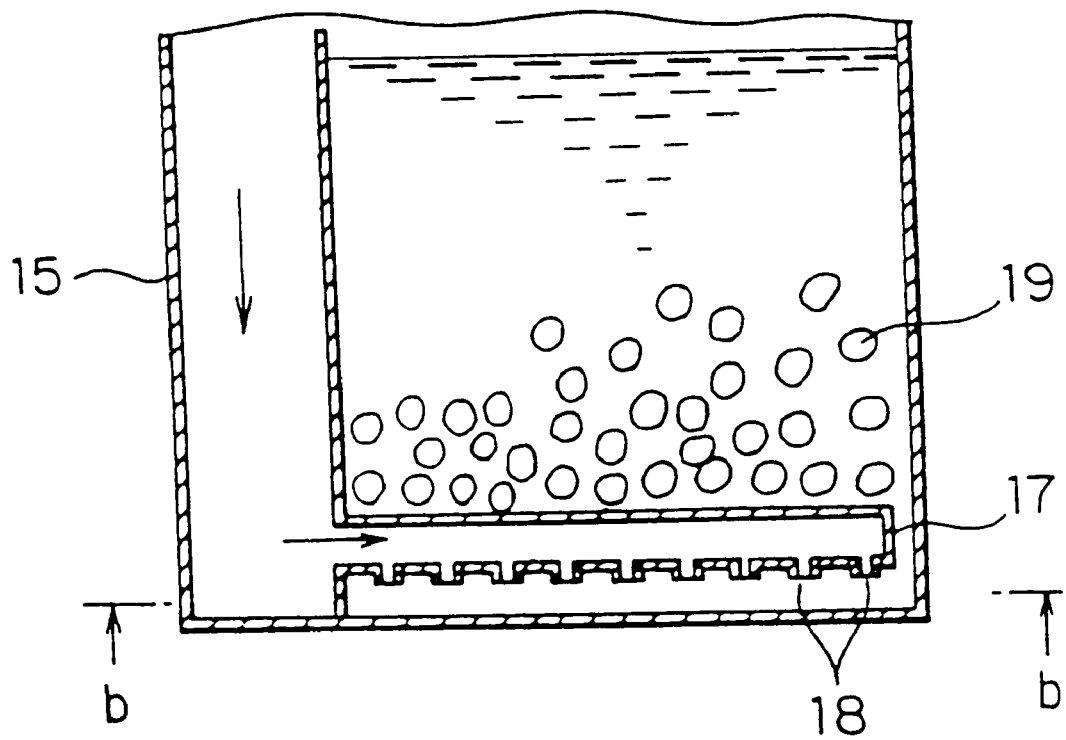
FIG. 4 is an enlarged view of a modified neutralizing zone in FIG. 1.
Figure 5:
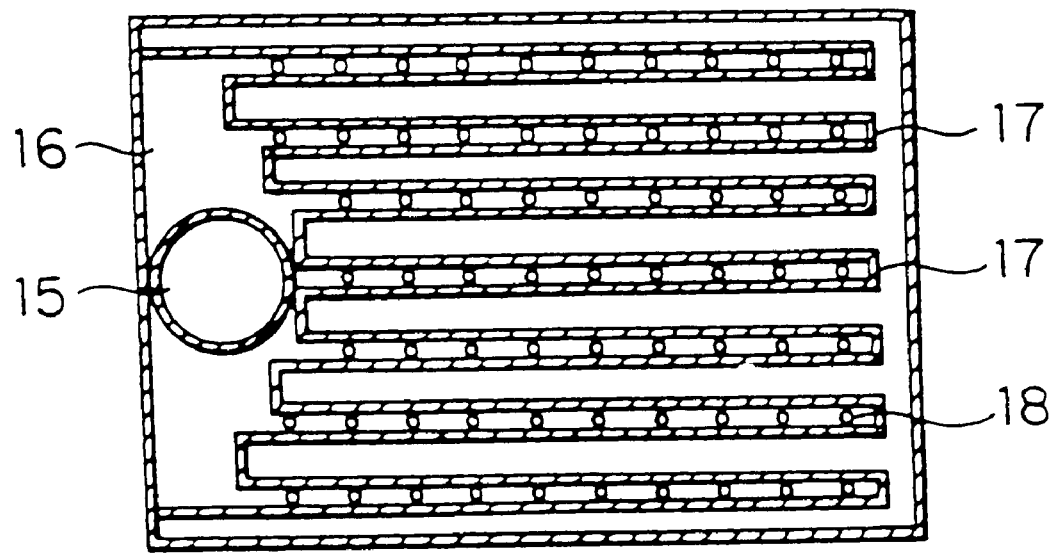
FIG. 5 is a modification taken on line b—b in FIG. 4.

When the circulation tank 6 has a squared shape, 15, 16 and 17 as shown in FIGS. 4 and 5, respectively, may be used. FIG. 4 is a side view of the circulation tank 6 and FIG. 5 is a sectional view taken on line b—b in FIG. 4. The branch pipe 16 is connected to a side surface close to the bottom of the introducing pipe 15, while plural dispersing pipes 17 extending from the branch pipe 16 cover the bottom of the circulation tank 6. The exit speed of the absorbing liquid from the dispersing holes 18 of each branch pipe 17 is designed to be above a predetermined rate.

A spray header used in the spraying zone for spraying the absorbing liquid may be in the form of the dispersing pipe 17 with dispersing holes 18 provided by removal of the nozzles 4.

Figure 6:
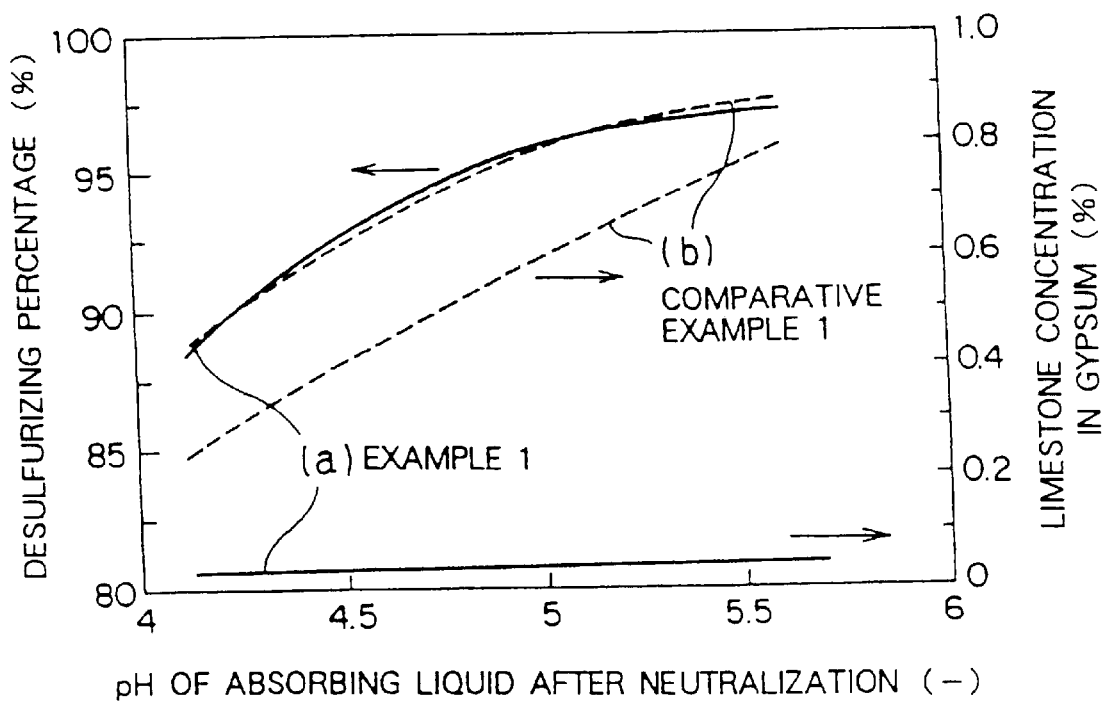
FIG. 6 is a graph illustrating the relationship between pH of absorbing liquid and desulfurizing percentage or limestone concentration in gypsum in Example 1 (full line) and Comparative Example 1 (broken line)

In the desulfurization plant according to Example 1, a desulfurizing test was conducted using limestone having a weight-average diameter of 2 mm. $SO_2$ concentration of the exhaust gas at the inlet of the desulfurization plant was 1,000 ppm. The molar amount of air blown into the circulation tank 6 was 30 times that of the $SO_2$ in the exhaust gas. The relationship between pH value after neutralization and desulfurization percentage, as well as limestone concentration in the gypsum product is shown in by a full line (a) in FIG. 6. Adjustment of the pH value after neutralization was by changing the amount of limestone. While the desulfurizing percentage increases with an increase in the pH value of the absorbing liquid, the limestone concentration in the gypsum shows little increase with an increase in the pH value after neutralization and is very low at 0.1% or less. This demonstrates that the gypsum removed from the circulation tank 6 through the outlet 20 has higher quality.

Upward flow velocity of the absorbing liquid was controlled by changing the sectional area of the limestone layer 19 (the amount of limestone being kept constant).

Figure 7:
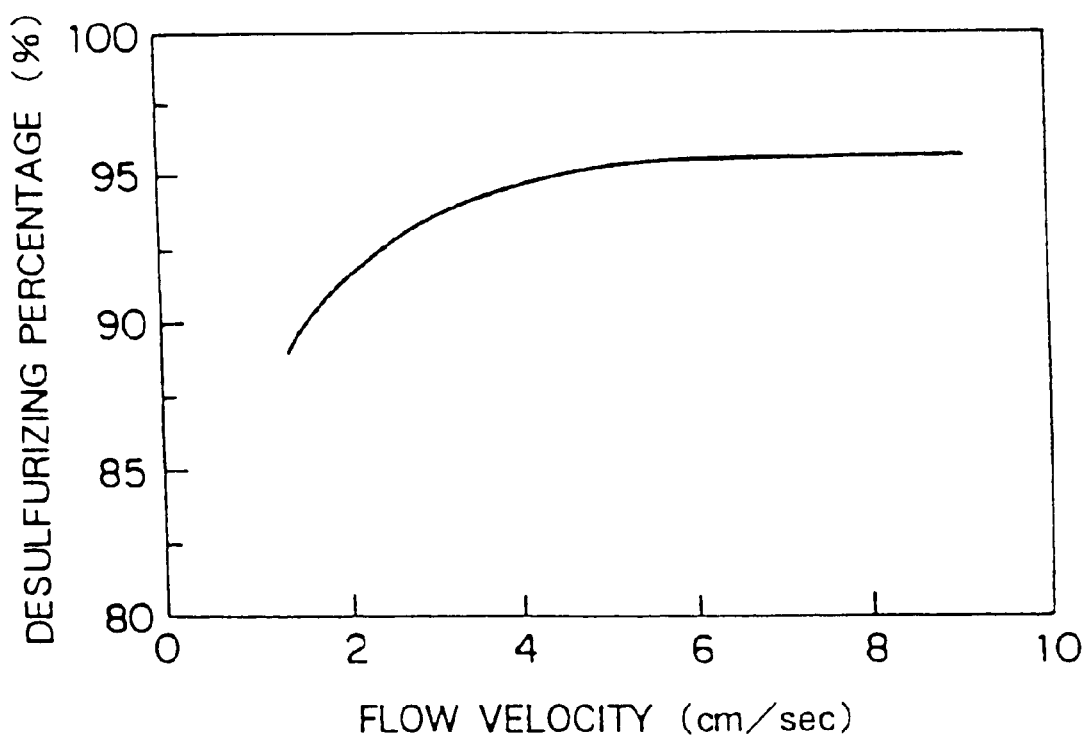
FIG. 7 is a graph illustrating the relationship between flow velocity of an upward flow of absorbing liquid through a limestone layer and a desulfurizing percentage in Example 1.

FIG. 7 is a graph illustrating the relationship between upward flow velocity of the absorbing liquid in the limestone layer 19 and the desulfurizing percentage. With an increase in the upward flow velocity of the absorbing liquid, the desulfurizing percentage is improved and remains nearly constant at the upward flow velocity of 6 cm/sec. The upward flow velocity is a value obtained by dividing the amount of liquid flow by the sectional area of the limestone layer 19.

When the $SO_2$ concentration in the exhaust gas at the inlet duct 2 of the desulfurization tower was changed from 100 to 5,000 ppm, the desulfurizing percentage increases with an increase in the upward flow velocity of the absorbing liquid in the limestone layer 19 for any concentration within this range, and remains nearly constant at the upward flow velocity of 6 cm/sec. Preferably, the upward flow velocity of the absorbing liquid is 3 to 15 cm/sec., depending on the particle diameter of the limestone. The desulfurizing performance decreases at lower velocity and the pressure loss increases at a velocity higher than the preferred range given above.

Figure 8:
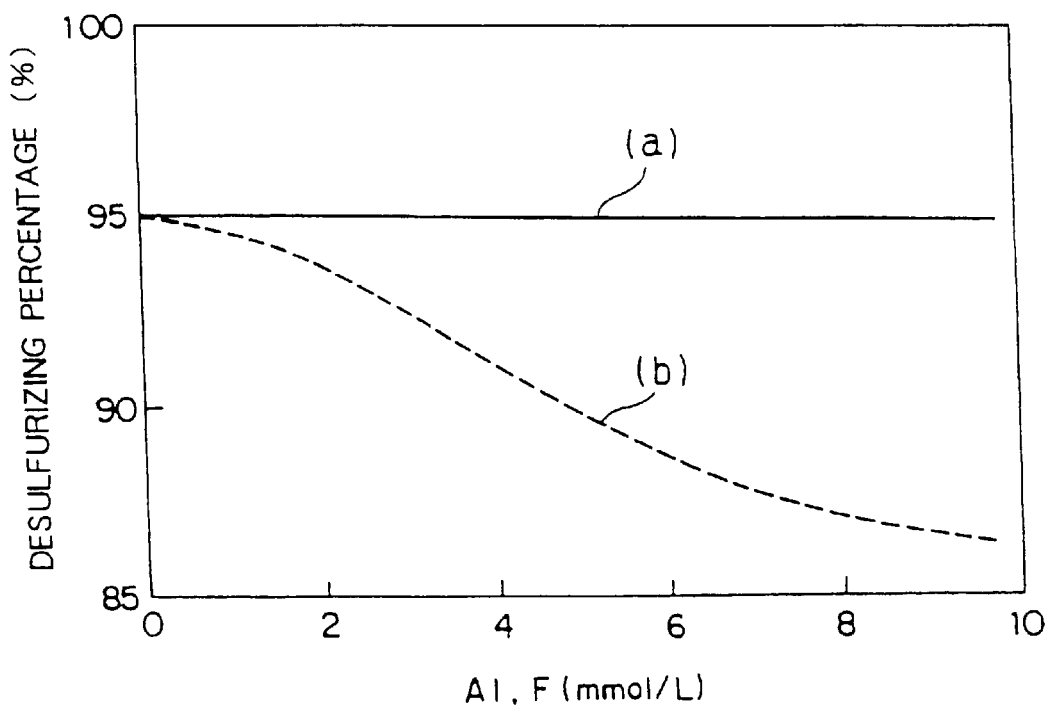
FIG. 8 is a graph illustrating the relationship between concentration of components Al and F in the absorbing liquid and desulfurizing rate in Example 1 (full line (a)) and Comparative Example (broken line (b))

When equimolar amounts of $AlCl_3$ and NaF are added together as a reagent to the absorbing liquid to change concentration of Al and F components in the absorbing liquid, with a predetermined height of the limestone layer and particle diameter of limestone, the desulfurizing percentage changes as shown by a full line (a) in FIG. 8. Little decrease in the desulfurizing percentage is observed even when concentration of Al and F components is 5 mmol/L.

Although the absorbing liquid drained from the circulation tank 6 is directly fed to the spray nozzles 4 and the hydroextractor 13 in this Example, limestone in the absorbing liquid exiting the circulation tank 6 may be separated by means of a separator, which is not shown. The resulting absorbing liquid from which limestone has been removed is dehydrated to collect gypsum of high quality.

While operation of the desulfurization plant is stopped for periodic inspection of various units and devices included therein, limestone in the circulation tank 6 is removed and replaced by new limestone if necessary, the removal of the used limestone being easy after the limestone layer 19 is fluidized. That is, pumping limestone in a static condition is quite difficult but is easy when in a fluidized condition together with the liquid. However, a part of limestone still remains in the neutralizing zone upon removal in such a manner because the absorbing liquid is more easily drained than the limestone. Accordingly, in order to remove limestone completely from the neutralizing zone, it is possible that the absorbing liquid and limestone are allowed to stand so as to settle out the limestone and only the liquid is recycled to the neutralizing zone. Limestone thus removed is not wastefully discarded but is ground to reduce its particle diameter to some extent so as to expose considerably more reactive surface area for reuse thereof.

COMPARATIVE EXAMPLE 1

In the same desulfurization plant as that in Example 1, the desulfurizing performance was tested using limestone having an average particle diameter of 10 $\mu$m. Because of the smaller particle diameter of limestone, the limestone is suspended in the absorbing liquid in this Comparative Example and does not form any fluidized bed as observed in Example 1. The relationship between pH of the absorbing liquid after neutralization and the desulfurizing percentage as well as concentration of limestone in gypsum is shown by a broken line (b) in FIG. 6. When pH value after neutralization is the same, then the desulfurizing percentage is the same as that of Example 1. However, it is seen that the concentration of limestone in gypsum is higher than that of Example 1, and with an increase in the pH value, such concentration increases and the quality of gypsum obtained is reduced.

COMPARATIVE EXAMPLE 2

When equimolar amounts of $AlCl_3$ and NaF are added together as reagents to the absorbing liquid to change concentration of Al and F components in the absorbing liquid with a predetermined concentration of limestone in the absorbing liquid etc., the desulfurizing percentage changes as shown by a broken line (b) in FIG. 8. The desulfurizing percentage is considerably lower as compared with that of Example 1.

EXAMPLE 2

Figure 9:
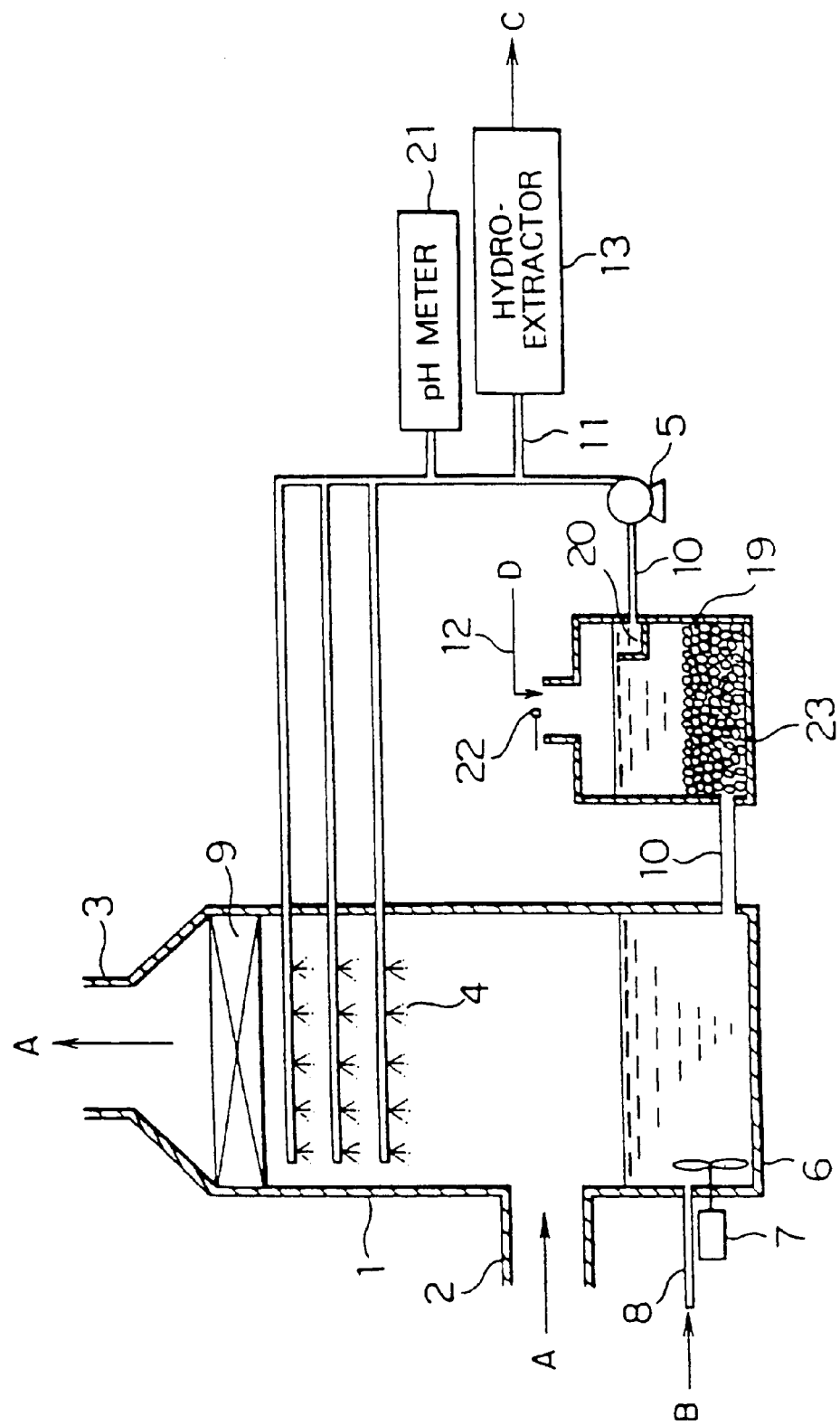
FIG. 9 is a flow-sheet of a desulfurizing plant of Example 2.

The desulfurization plant used in Example 2 is shown in FIG. 9. In contrast to Example 1 in which the absorbing liquid is neutralized in the circulation tank 6, a neutralizing unit 23 arranged external to the circulation tank 6 is-used in this Example 2. Similar to a conventional desulfurization tower as shown in FIG. 39, the plant in this Example comprises a tower body 1, an inlet duct 2, an outlet duct 3, a spray nozzle 4, an absorbing liquid pump 5, a circulation tank 6, a stirrer 7, an air blower 8, a mist eliminator 9 and the like, and is further provided with the neutralizing unit 23 for increasing the pH value of the absorbing liquid which has previously been reduced due to absorption of $SO_2$ in the exhaust gas A.

As in Example 1, the absorbing liquid selectively absorbs $SO_2$ from the exhaust gas A to form sulfurous acid, which is then oxidized in the circulation tank 6 to yield sulfuric acid. The absorbing liquid containing sulfuric acid is fed to the neutralizing unit 23 by means of a pump (not shown) and neutralized therein by limestone to form gypsum. A part of the absorbing liquid after neutralization is fed to a dehydrator or hydroextractor 13 and dehydrated to collect gypsum C. On the other hand, the absorbing liquid thus neutralized is recycled to spray nozzles 4 to selectively absorb $SO_2$. Limestone D is fed to the neutralizing unit 23 through a limestone supplying pipe 12.

Also as in Example 1, when dry limestone is supplied pneumatically to the tower through the limestone supplying pipe 12, in order to prevent a deposition of wetted limestone in the supplying pipe 12, it is also desirable in this Example to provide a wash-water spray nozzle 22 for periodically washing the inner wall of the limestone supplying pipe 12 to remove the limestone deposit.

Using the desulfurization plant of this Example, a desulfurizing test was conducted. The $SO_2$ concentration in the exhaust gas A at the inlet of the desulfurization tower was 1,000 ppm. Limestone (having an average particle diameter of 5 mm) was loaded in advance in the neutralizing unit 23 in an amount equimolar to the amount of the $SO_2$ in the exhaust gas, i.e., an amount sufficient to desulfurize for two hours, and further supplied thereto in an amount of 0.97 mole per mole of $SO_2$ in the exhaust gas A through the supplying pipe 12. The amount of air blown into the circulation tank 6 was 30 times the molar amount of $SO_2$ in the exhaust gas.

Figure 10:
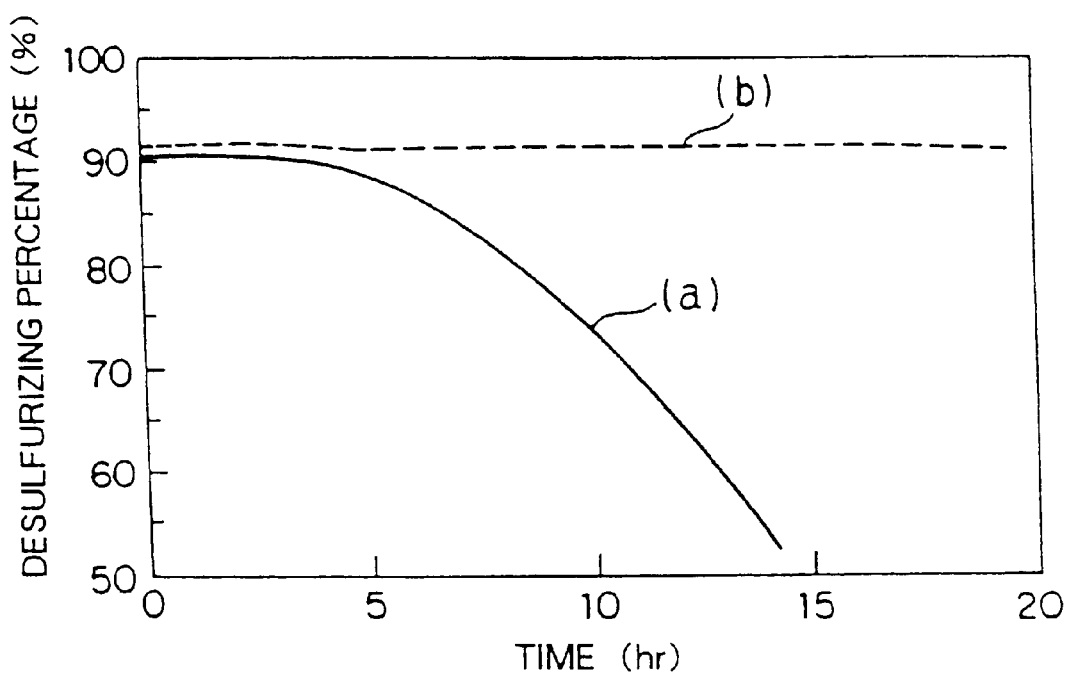
FIG. 10 is a graph illustrating change of the desulfurizing rate with time in Example 2, a full line showing a result obtained when a limestone layer is allowed to stand in a neutralizing zone and a broken line showing that obtained when limestone is stirred in the neutralizing zone.
Figure 11:
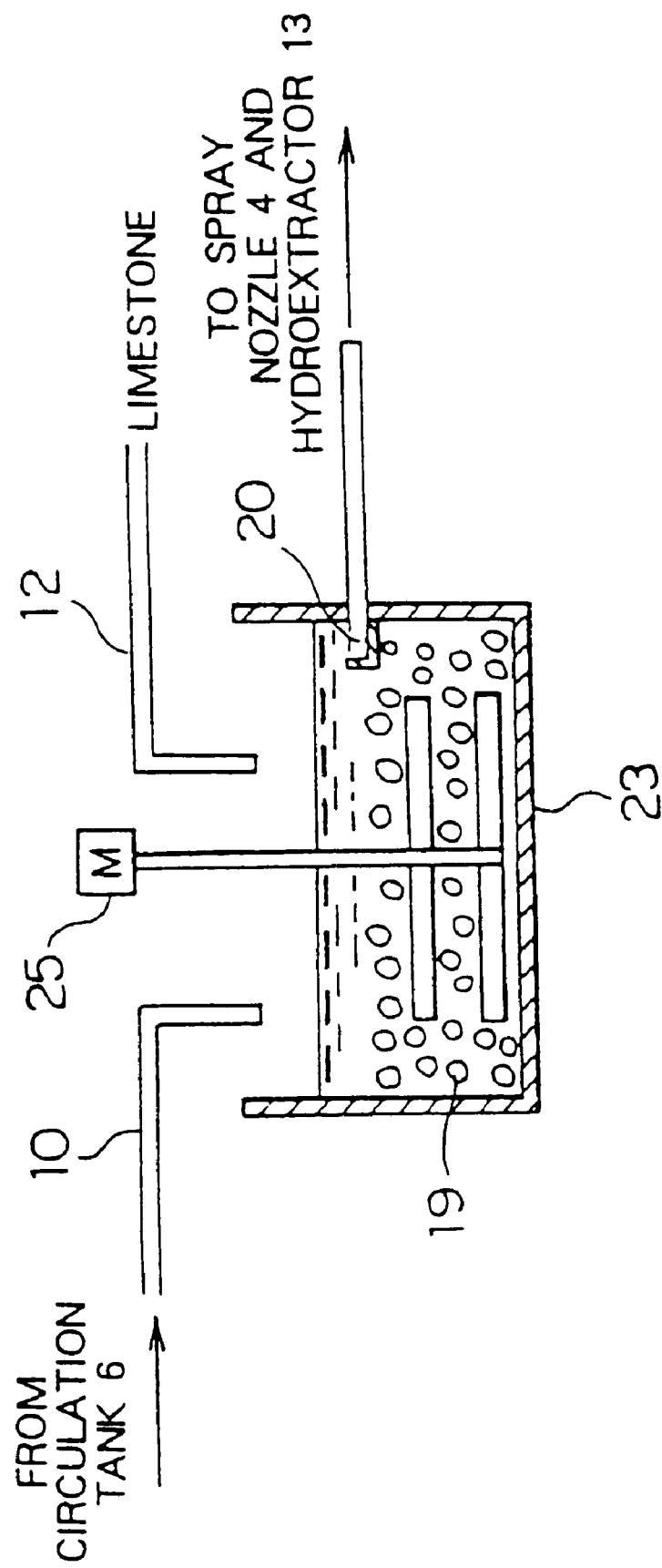
FIG. 11 is a schematic view of a neutralizing apparatus provided with a stirrer used in Example 2.

A change in the desulfurizing percentage with time is shown by a full line (a) in FIG. 10 when the limestone layer 19 is allowed to stand in the neutralizing unit 23. Higher desulfurizing performance was observed in the beginning, which decreased with the lapse of time. This is explained by the finding that gypsum particles form a coating on the surfaces of the limestone particles in the neutralizing unit 23 thereby decreasing the reactivity of limestone. Then, the structure of the neutralizing unit 23 was modified to agitate the limestone contained therein by means of a stirrer 25 as shown in FIG. 11. Change in the desulfurizing percentage with time after such a modification is shown by a curve b in FIG. 10. It was observed that the desulfurizing performance did not decrease but remained at a high level over a longer period of time. When the $SO_2$ concentration in the exhaust gas A at the outlet of the desulfurization tower was changed from 100 to 5,000 ppm., the desulfurizing performance was kept at a higher level over a longer period of time for any concentration by using the stirrer 25.

Any structure in which limestone having an average diameter of 1 mm or so is agitated by the absorbing liquid may be used as the structure of the neutralizing unit 23. As shown in FIG. 11, the absorbing liquid containing sulfuric acid is fed from the circulation tank 6 to the neutralizing unit 23 through a pipe line 10 and neutralized by limestone D with stirring by means of the stirrer 25. Because of the smaller particle diameter of the gypsum compared with that of the limestone, only the gypsum particles and water are removed from an upper portion of the neutralizing unit 23 to the spray nozzles 4 and hydroextractor 13, while the limestone D is selectively left in the neutralizing unit 23. As the neutralizing unit 23 is a device for reacting limestone and the absorbing liquid, any structure in which a substantial flow of the limestone particles downstream does not occur may be used.

Further, prevention of coating of the gypsum particles on the surface of the limestone particles by means other than the stirrer 25 may be by bubbling gas such as air among the limestone particles.

Figure 12:
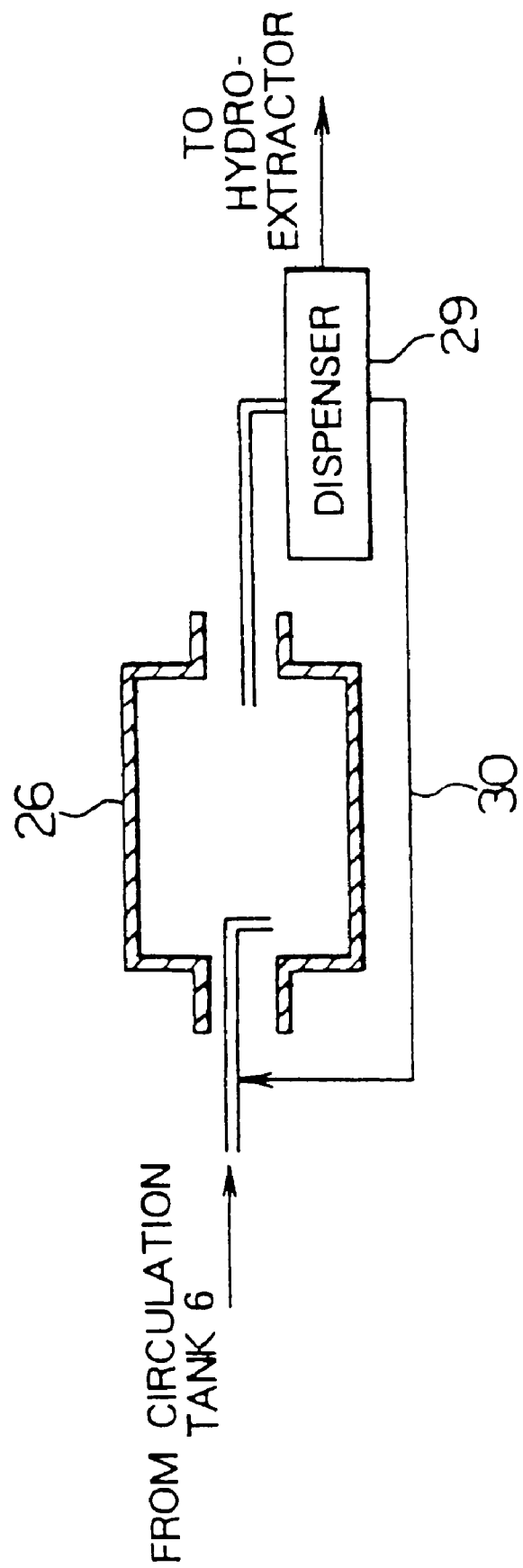
FIG. 12 is a schematic view of a rotary wet process kiln used as a neutralizing device in Example 2.

A rotary wet kiln 26 as shown in FIG. 12 may also be used as the neutralizing unit 23. In this case, loaded limestone (not shown) is agitated by rotation of the wet kiln 26. On the other hand, FIG. 13 is a schematic view of a desulfurization plant in which a rake 27 is arranged on the bottom of the circulation tank 6.

When the kiln 26 shown in FIG. 12 is used, it is possible to control residence time of the absorbing liquid in the kiln 26 by changing the rate of rotation of the kiln 26 instead of adjusting that of the stirrer 25, or by recycling a part of the absorbing liquid to the inlet of the kiln 26 through a pipe line 30 by means of a dispenser 29 at the outlet of the kiln 26, instead of adjusting an amount of the absorbing liquid (tank level) in the neutralizing unit 23 shown in FIG. 11.

Figure 13:
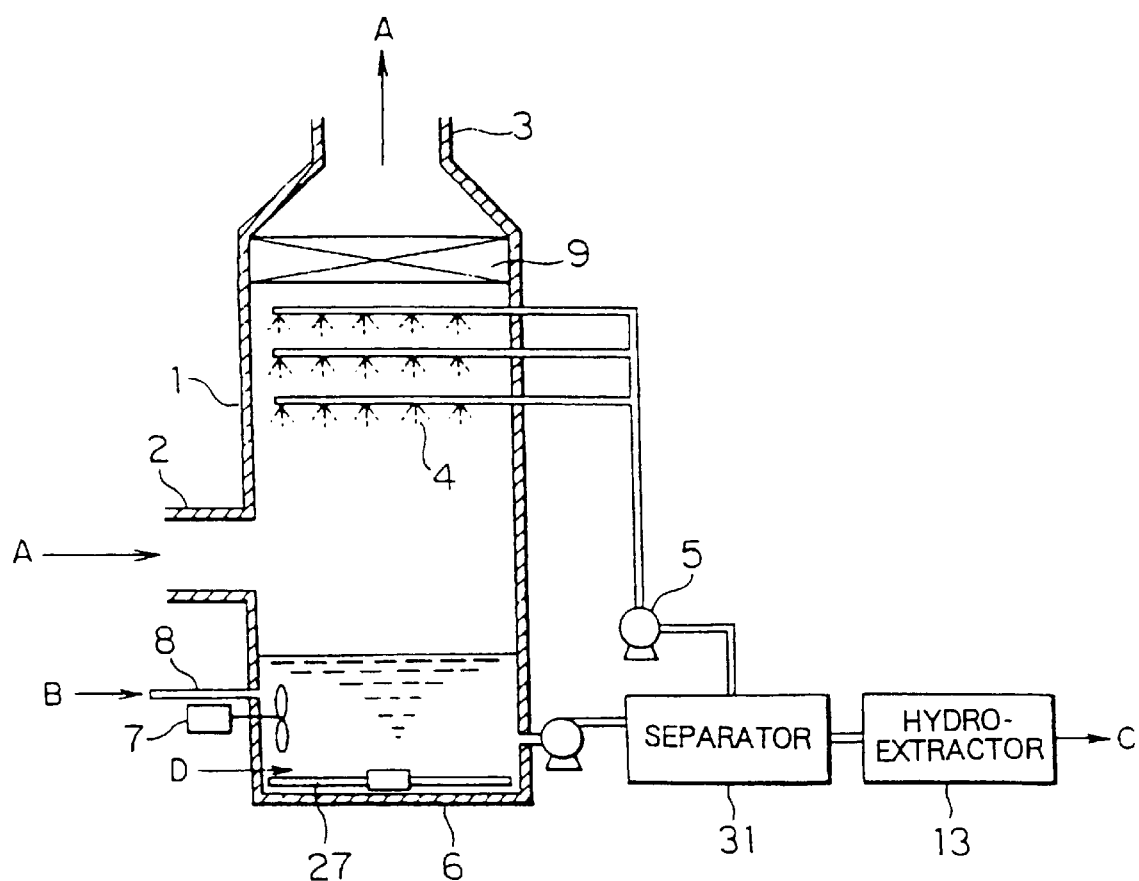
FIG. 13 is a schematic view of a desulfurization plant in which a rake is arranged in the bottom of a circulation tank used as a neutralizing device in Example 2.

Further, when the rake 27 is provided in the bottom of the circulation tank 6 as shown in FIG. 13, instead of the neutralizing unit 23 external to the desulfurization tower, the limestone particles (not shown) are loaded into the circulation tank 6, while the concentration of $SO_2$ at the outlet of the desulfurization tower may be controlled by changing the rate of rotation of the rake 27. FIG. 13 shows an example in which a limestone-gypsum separator 31 is arranged external to the desulfurization tower.

EXAMPLE 3

Figure 14:
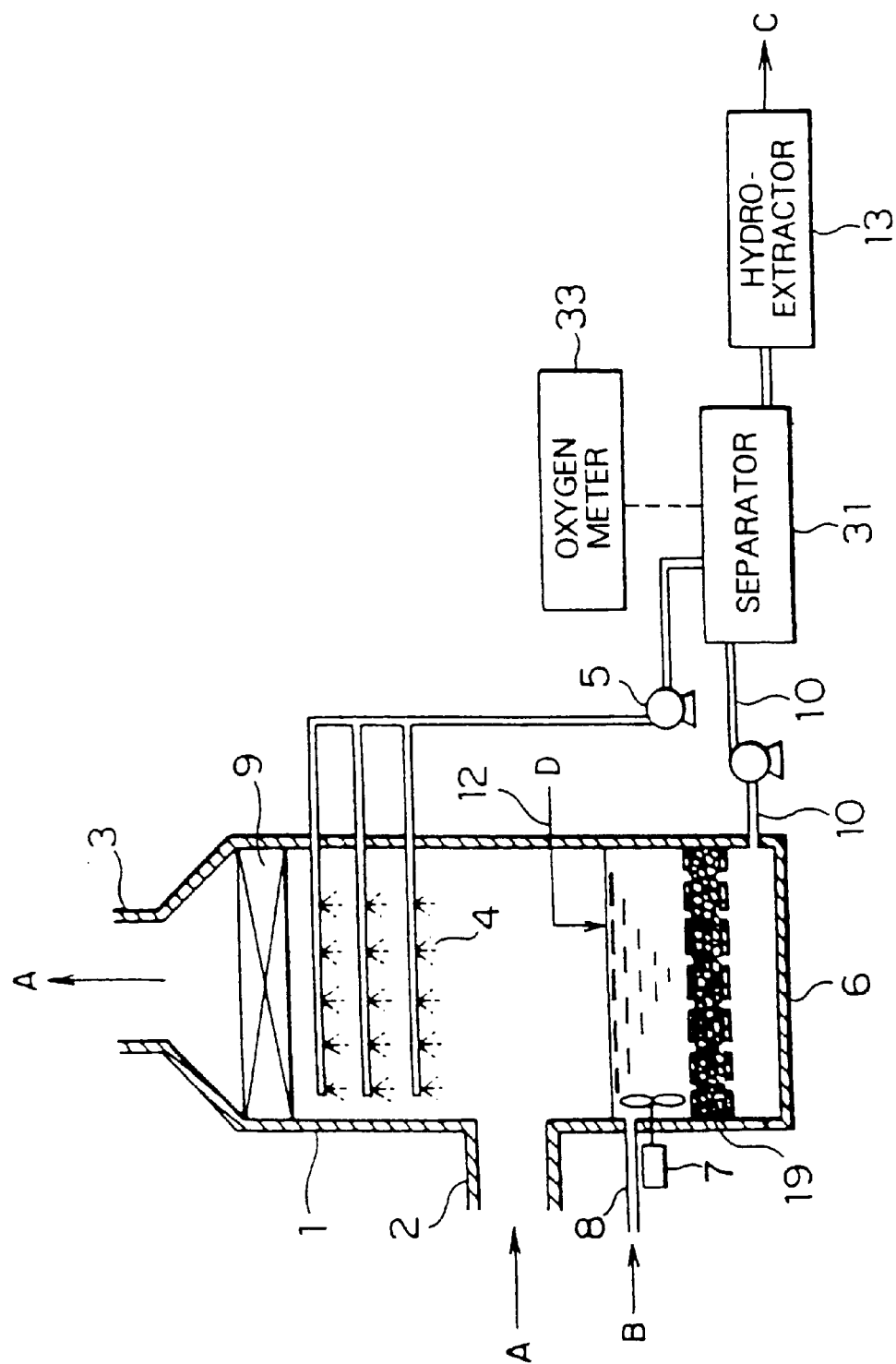
FIG. 14 is a schematic view of a desulfurization plant used in Example 3.

While the neutralizing unit 23 is arranged outside of the desulfurization tower in Example 2, it is also possible to load limestone D into the bottom portion of the circulation tank 6 and the absorbing liquid drained therefrom is neutralized by passage through a layer 19 of limestone D and then routed to the separator 31 as shown in FIG. 14. Oxidized absorbing liquid is neutralized by the layer 19 of limestone D and fed to the separator 31 to separate gypsum and limestone, whereby an absorbing liquid of a lower limestone content is fed to the hydroextractor 13 to dehydrate and collect gypsum C. On the other hand, the absorbing liquid of a higher limestone content is recycled to the spray nozzles 4 in the tower body 1 to selectively absorb $SO_2$.

It is preferable to remove gypsum coatings from the surfaces of the limestone even when the desulfurization plant has the structure described above.

Figure 15:
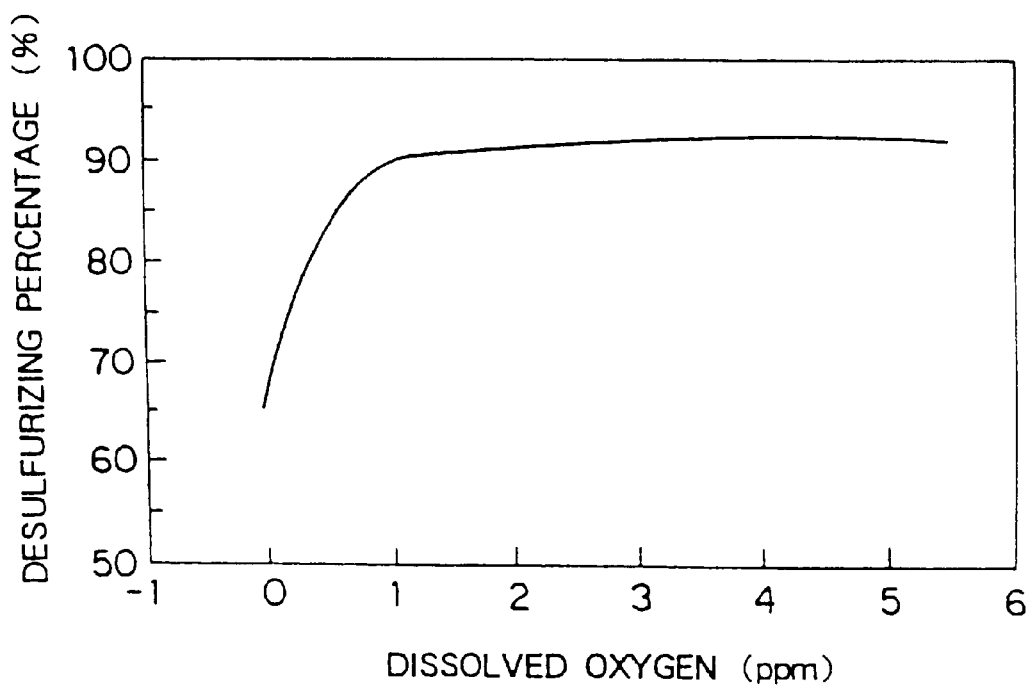
FIG. 15 is a graph illustrating the relationship between concentration of dissolved oxygen in an absorbing liquid after neutralization and desulfurizing rate in Example 3.

While changing the amount of air B blown into the circulation tank 6 shown in FIG. 14 within a range of 10 to 100 times that of $SO_2$ in the exhaust gas A and determining dissolved oxygen concentration in the separator 31 by a dissolved oxygen meter 33, the desulfurizing performance was checked. The relationship between the dissolved oxygen content and the desulfurizing percentage is illustrated in FIG. 15, in which the desulfurizing percentage decreases when the dissolved oxygen concentration falls to less than 1 ppm. Presumably this is because $H_2SO_3$ is left in the liquid as a result of an incomplete oxidation reaction ($H_2SO_3+1/2O_2=H_2SO_4$) if the amount of air blown into the circulation tank 6 is too small, thereby retarding the absorbing reaction ($H_2O+SO_2=H_2SO_3$). It is thus preferred to control the amount of oxidizing air to keep the dissolved oxygen concentration in the absorbing liquid above 1 ppm by determining such concentration.

While the dissolved oxygen concentration in the absorbing liquid is determined by monitoring the separator 31 in this example, the dissolved oxygen in the absorbing liquid may also be conducted at other sites such as in the neutralizing unit 23, etc. if the absorbing liquid has been oxidized at that site.

If the required quality of gypsum is low or the concentration of limestone particles in the absorbing liquid is low, the separator 31 may be omitted and further it is possible to combine the neutralizing unit 23 and the separator 31 to provide these functions in a single piece of apparatus. Any apparatus in which the gypsum particles and water can be separated, such as a thickener, a centrifugal hydroextractor 13 or dehydrator or the like may be used as the separator 31.

EXAMPLE 4

Figure 16:
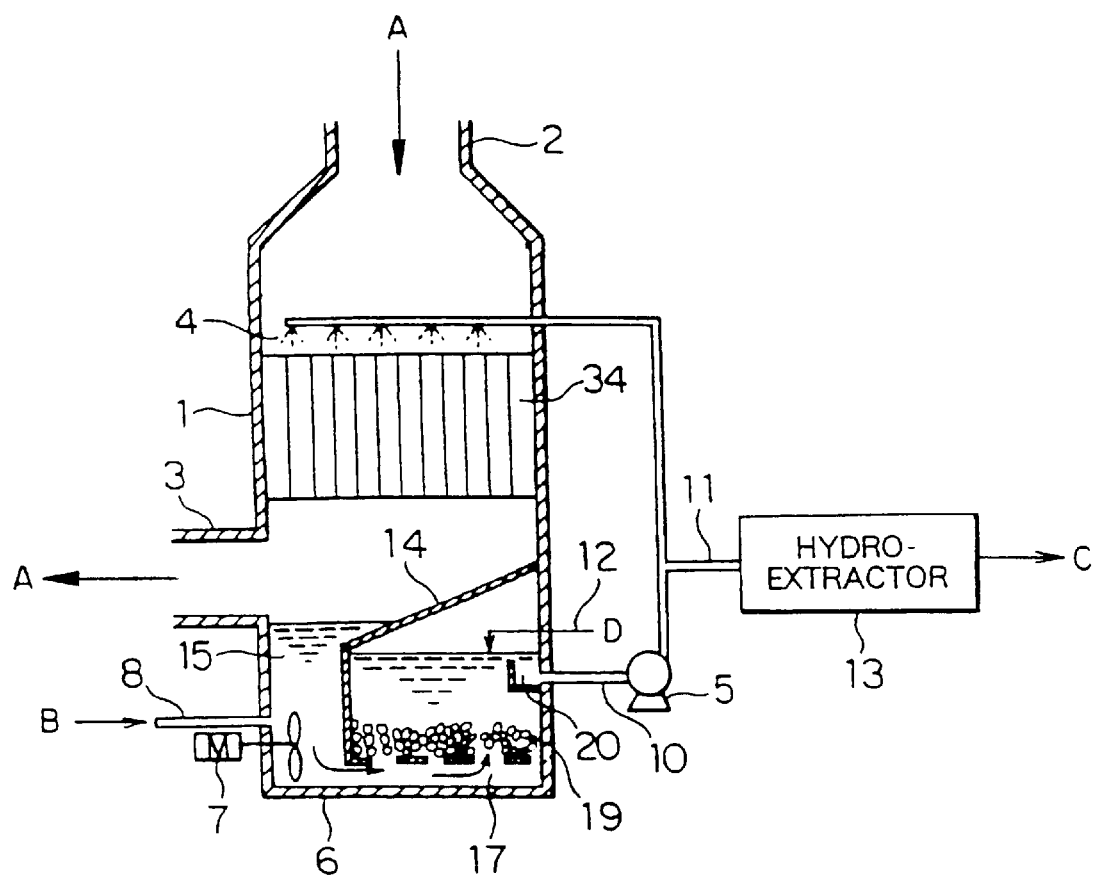
FIG. 16 is a schematic view of a desulfurization plant having a grid tower used in Example 4 according to the present invention.

FIG. 16 shows the desulfurization plant provided with a grid tower according to the present invention. The desulfurization plant shown in FIG. 16 is a modification of that of shown in FIG. 1 in which the desulfurizing process is similarly carried out as in the spraying desulfurization tower in Example 1 except that absorption of $SO_2$ from the exhaust gas is conducted within the grid 34 arranged in the desulfurization tower and the flow direction of the exhaust gas is different.

The exhaust gas A exhausted from a boiler is introduced in the desulfurization tower body 1 from an inlet duct 2 arranged at the top thereof and exhausted from an outlet duct 3 arranged at a lower position thereof. During this process, the absorbing liquid pumped by means of an absorbing liquid pump 5 is fed as a spray on the top of the grid 34 through plural spray nozzles 4 or openings, whereby gas-liquid contact between the absorbing liquid and the exhaust gas A is obtained on the grid 34. Thus, $SO_2$ in the exhaust gas A is selectively absorbed by the absorbing liquid to form sulfurous acid.

Absorbing droplets containing sulfurous acid thus formed are collected in a circulation tank 6 and sulfuric acid subsequently formed in the absorbing liquid is neutralized by limestone in passage through a limestone layer 19 to form gypsum in a manner similar to the process in Example 1.

EXAMPLE 5

Figure 17:
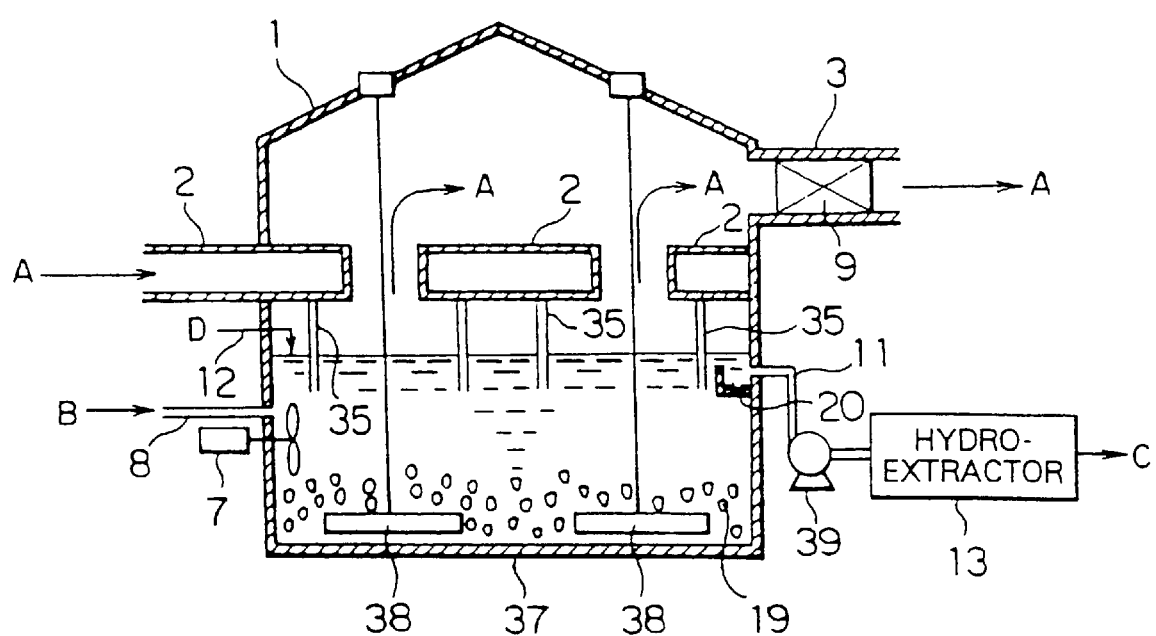
FIG. 17 is a schematic view of a jet bubbling desulfurization plant used in Example 5 according to the present invention in which exhaust gas is jetted into absorbing liquid through a pipe.

FIG. 17 shows the desulfurization plant used in this example in which the exhaust gas is blown into the absorbing liquid through a pipe. In FIG. 17, apparatus components functioning similarly as those shown in FIG. 1 are referenced with the same numerals and a further description thereof is omitted.

The exhaust gas A exhausted from a boiler is introduced in a desulfurization tower body 1 from an inlet duct 2 and exhausted from an outlet duct 3. During this process, the exhausted gas A is blown into the absorbing liquid in a storing tank 37 thereof arranged at the bottom of the desulfurization tower body 1 through an exhaust gas blowing pipe 35 connected to the inlet duct 2, whereby gas-liquid contact between the absorbing liquid and the exhaust gas A is achieved.

Thus, $SO_2$ in the exhaust gas is selectively absorbed by the absorbing liquid in the tank 37 to form sulfurous acid. With agitation with a stirrer 38, sulfurous acid is oxidized to sulfuric acid by oxidizing air B blown into the absorbing liquid in the tank 37 from a blower 8 and neutralized by a limestone layer 19 loaded in the tank 37 to form gypsum. Limestone D is agitated in the tank 37 by means of the stirrer 38. A part of the absorbing liquid in the tank 37 is fed from an outlet 20 of the tank 37 to a hydroextractor 13 through a gypsum draining pipe 11 by means of a pump 39 to collect gypsum C. Limestone D is supplied into the tank 37 through a limestone supplying pipe 12.

Figure 33:
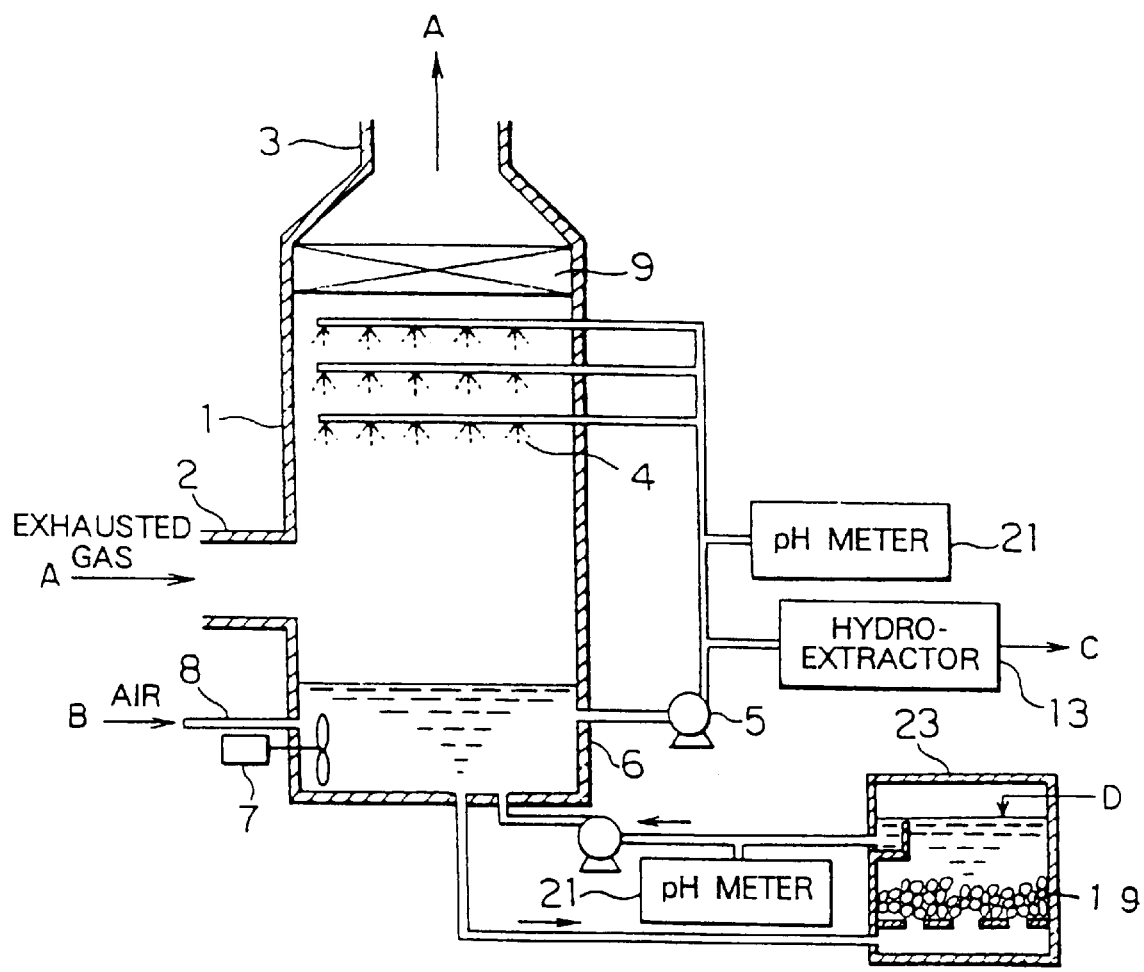
FIG. 33 is a schematic view of the desulfurization plant used in Example 15 in which a neutralizing zone is provided external to the circulation tank, only a part of absorbing liquid in the circulation tank being recirculated to the spray nozzles and the rest being circulated to the neutralizing device.

While the absorbing liquid is neutralized in the circulation tank 6 and the tank 37 in Examples 4 and 5, respectively, the neutralizing unit may be arranged outside of the desulfurization tower as in Example 2. For example, in the case of Example 5, a part of the absorbing liquid may be drained from the tank 37 for neutralization in the neutralizing unit and then recycled to the desulfurization tower as shown in FIG. 33.

EXAMPLE 6

Figure 18:
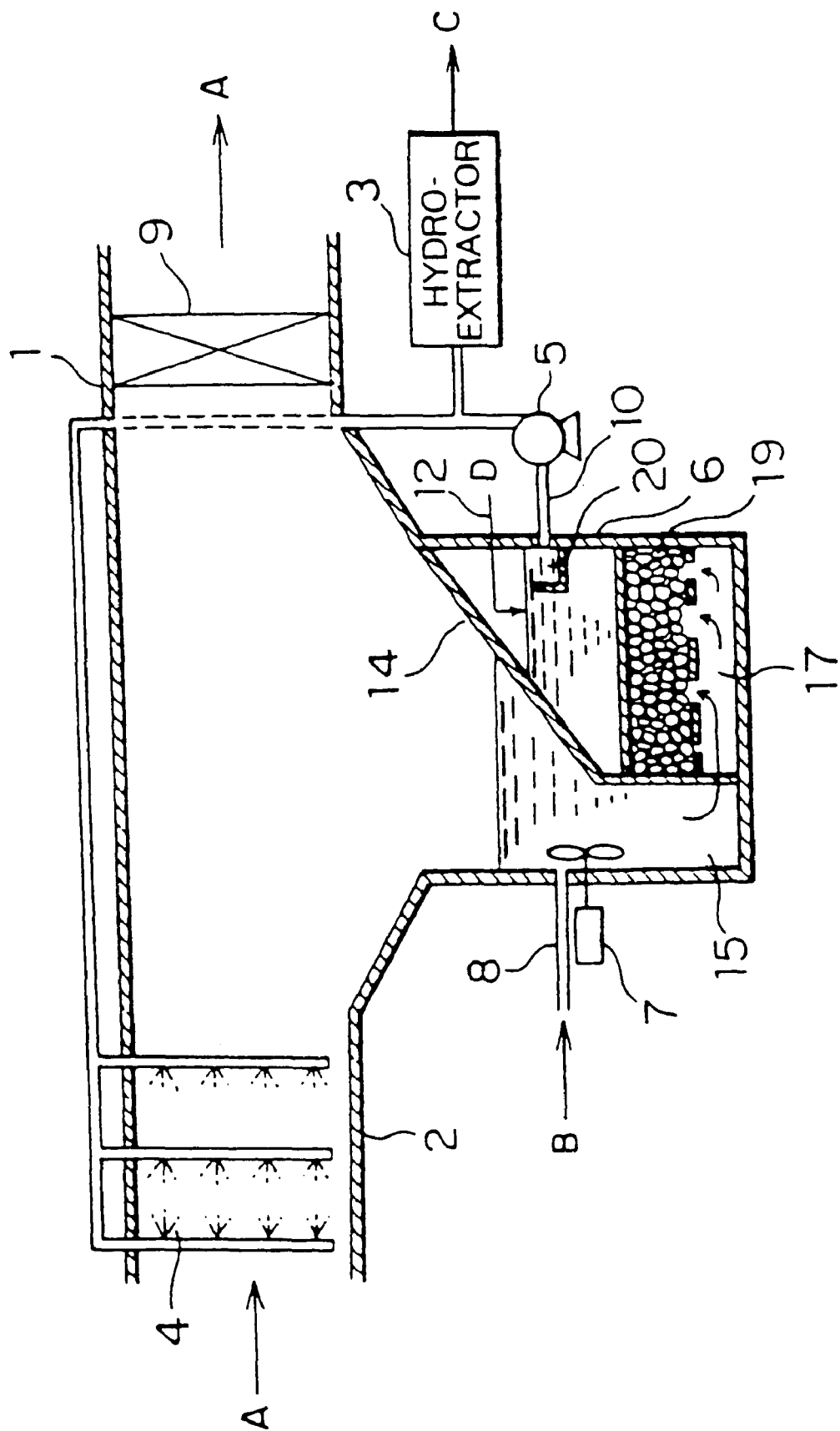
FIG. 18 is a schematic view of a horizontal (or crosswise) desulfurization plant used in Example 6 according to the present invention.

Although a vertical desulfurization tower in which the exhaust gas is introduced from a lower or upper portion of the desulfurization tower and exhausted from the other of the upper and lower portions thereof is used in Examples 1 to 5, a horizontal (crosswise) type flue gas desulfurization plant in which the flow path of the exhaust gas is horizontal as shown in FIG. 18 is also effectively used in the present invention. The desulfurization tower in this example comprises a desulfurization tower body 1, an inlet duct 2 and an outlet duct 3. Spray nozzles 4 for the absorbing liquid are arranged in the inlet duct 2 to spray the absorbing liquid into the exhaust gas to absorb $SO_2$ followed by collection of the absorbing liquid containing $SO_2$ in a circulation tank 6 arranged at the bottom of the desulfurization tower and oxidation. The outlet duct 3 is provided with a mist eliminator 9 so as not to exhaust mist from the desulfurization tower.

The exhaust gas A exhausted from a boiler (not shown) is introduced in the desulfurization tower body 1 from the inlet duct 2 and exhausted from the outlet duct 3. During this process, the absorbing liquid pumped by means of an absorbing liquid pump is sprayed into the desulfurization tower through the plural spray nozzles 4 for gas-liquid contact between the absorbing liquid and the exhaust gas A. Thus, $SO_2$ in the exhaust gas A is selectively absorbed by the absorbing liquid to form sulfurous acid. Spray droplets containing sulfurous acid thus formed are allowed to drop onto a collecting plate 14 arranged on the circulation tank 6. The absorbing liquid dropped onto the collecting plate 14 is collected and fed to the bottom of the circulation tank 6 through an introducing pipe 15. Sulfurous acid is oxidized by air 2 injected from an air blower 8 to form sulfuric acid.

A dispersing pipe 17 is connected to the bottom of the introducing pipe 15, which allows the absorbing liquid to pass upward in the circulation tank 6, homogeneously throughout a plane thereof. The absorbing liquid led from the introducing pipe enters to the branch pipe 16 and is then led to the dispersing pipe 17. The dispersing pipe 17 has plural dispersing holes (not shown) through which the absorbing liquid and air are homogeneously and vigorously ejected throughout a plane parallel to the bottom of the circulation tank 6 to generate an upward flow. Sulfuric acid and limestone are reacted to form gypsum in a limestone layer 19 which is fluidizing by the absorbing liquid in the circulation tank 6. The absorbing liquid neutralized in the limestone layer 19 is pumped to the spray nozzles 4 by means of the absorbing liquid pump 5 through an absorbing liquid draining pipe 10. After neutralization, a part of the absorbing liquid is fed to a hydroextractor 13 to hydrate and collect gypsum C.

The absorbing towers of the present invention include those in which a gas path extends in the horizontal direction as shown in FIG. 18 and in which the gas path is slightly inclined.

EXAMPLE 7

A problem encountered in Example 2 as shown in FIG. 9 is addressed by this example.

While the absorbing liquid is neutralized by limestone D in the neutralizing unit 23 in FIG. 9, the neutralizing velocity slows down when gypsum particles are deposited on the surfaces of limestone particles and accordingly, the surfaces of the limestone particles should be renewed by the liquid in the neutralizing unit 23.

The absorbing liquid containing limestone should be agitated slowly but continuously, for example, in a tank provided with a wet kiln 26 (FIG. 12) or a stirrer 25 (FIG. 11), or by fluidizing limestone in the liquid. Further, according to the process shown in FIG. 9, the absorbing liquid in the neutralizing unit 23 is neutralized by rough limestone D of relatively large particle diameters, while the limestone D content in the absorbing liquid sprayed through the spray nozzles 4 is low. A problem in Example 2 is that the pH value of the absorbing droplets decreases with an increase in the $SO_2$ concentration at the inlet of the desulfurization plant, thereby decreasing the desulfurizing percentage.

According to this example, in a wet-type desulfurization plant in which the absorbing liquid of decreased pH is neutralized by a solid desulfurizing agent having relatively larger diameters, and not by finely ground limestone, economical and higher desulfurizing performance is achieved even when the $SO_2$ concentration increases at the outlet of the desulfurization plant.

Figure 19:
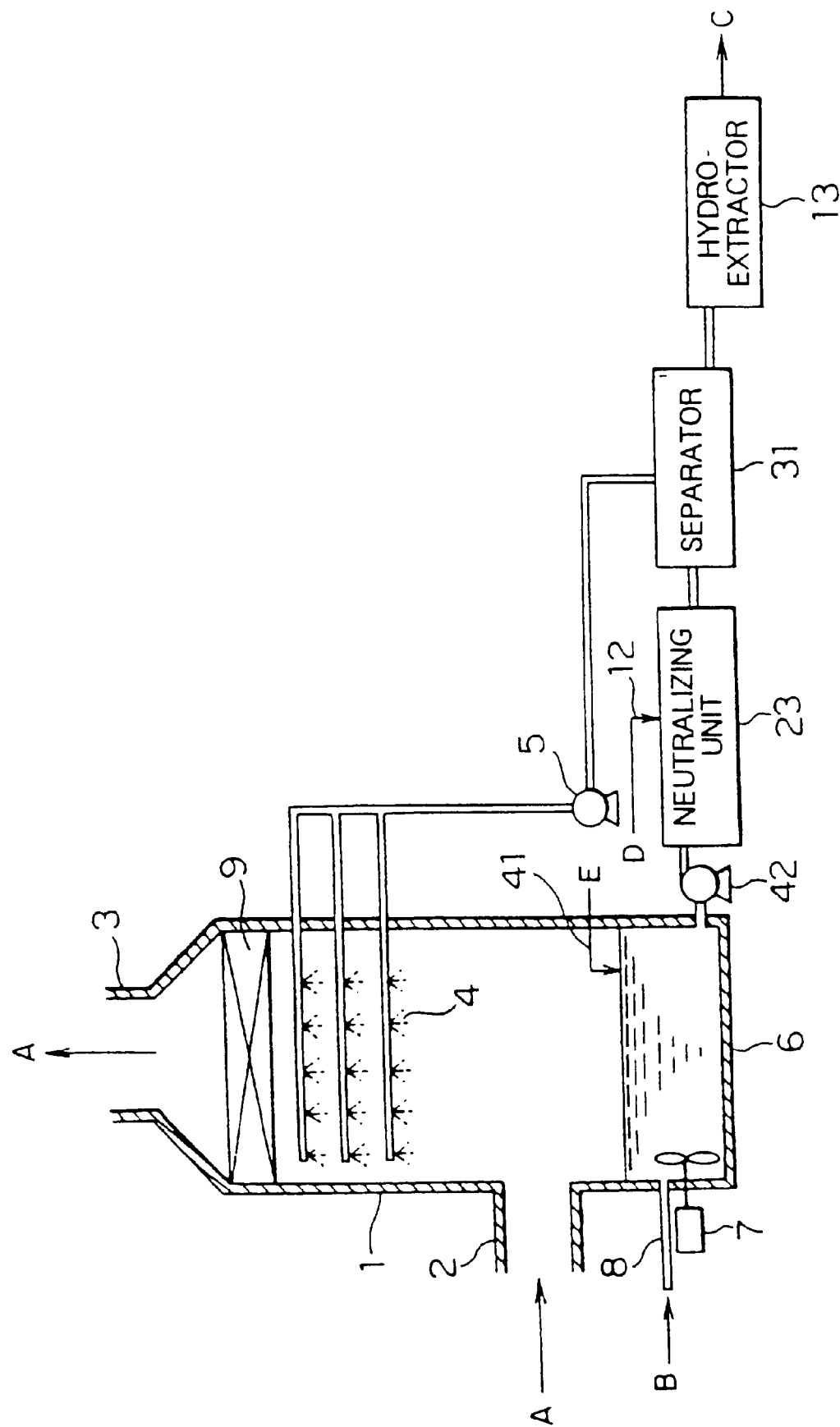
FIG. 19 is a schematic view of a desulfurization plant used in Example 7 in which a carboxylic acid or a salt thereof is supplied to the absorbing liquid.

The desulfurization plant used in this example is shown in FIG. 19, in which apparatus components functioning similar to those shown in FIG. 9 are referenced by the same numerals. The desulfurization plant of this example is further provided with, in addition to the equipment shown in FIG. 9, a pipe 41 for supplying a carboxylic acid or a salt thereof E (formic acid being used in this example).

The exhaust gas A exhausted from a boiler is introduced into the desulfurization tower body 1 from an inlet duct 2 and exhausted from an outlet duct 3. During this process, the absorbing liquid pumped by means of an absorbing liquid pump 5 is sprayed into the desulfurization tower through the plural spray nozzles 4, for gas-liquid contact between the absorbing liquid and the exhaust gas A. Thus, $SO_2$ in the exhaust gas A is selectively absorbed by the absorbing liquid to form sulfurous acid ($H_2O+SO_2=H_2SO_3$). The spray droplets containing sulfurous acid thus formed are allowed to drop into a circulation tank 6. Sulfurous acid is then oxidized in the circulation tank 6 to form sulfuric acid as follows:

$$H_2SO_3 + 1/2 O_2 = H_2SO_4 = 2H^+ SO_4^{2-}$$

According to the above chemical reaction, hydrogen ion ($H^+$) concentration in water temporarily increases (i.e., pH value of the absorbing liquid decreases), but when formic acid E is supplied thereto through the pipe 41, HCOO— and $H^+$ are combined together according to the following chemical reaction to decrease the hydrogen ion concentration in water (or increase the pH):

$$2HCOO{-} + 2H^+ = 2HCOOH$$

The absorbing liquid containing formic acid thus formed is pumped to a neutralizing unit 23 by means of a pump 42 followed by a reaction of HCOOH with limestone D ($CaCO_3$) to form HCOO— again in the neutralizing unit 23 according to the following chemical reaction:

$$2HCOOH + CaCO_3 = 2HCOO{-} + H_2O + Ca^{2+} + CO_2$$

When the concentration of $Ca^{2+}$ and $SO_4^{2-}$ in the water exceeds saturation, gypsum C is crystallized as follows:

$$Ca^{2+} + SO_4^{2-} + 2H_2O = CaSO_4 \cdot 2H_2O$$

In the reaction as a whole, expressed as follows, formic acid E is not consumed except when the acid is decomposed or itself evaporated, or dissolved in the water in which gypsum is deposited.

$$2H_2O + SO_2 + 1/2 O_2 + CaCO_3 = CaSO_4 \cdot 2H_2O + CO_2$$

While gypsum is contained in the absorbing liquid which has been neutralized in the neutralizing unit 23, it can be easily separated from the limestone because the particle diameter of the gypsum particles is about 10 to 50 Åm and that of limestone in the neutralizing unit 23 is about 10 mm on the average. In order to prevent run-off of rough limestone particles, for example, it is possible to arrange a wire mesh finer than the limestone particles at the outlet of the neutralizing unit 23 or to drain an upper portion of the absorbing liquid from the neutralizing unit 23. The absorbing liquid drained from the neutralizing unit 23, however, contains not only gypsum C but sometimes a slight amount of limestone and, if necessary, is fed to a separator 31 to separate the gypsum C and limestone D. A part of the thus treated absorbing liquid having a lowered limestone content is then fed to a hydroextractor 13 to hydrate and collect gypsum C, and the remaining part thereof, having a higher limestone content, is recycled to the spray nozzles 4 to selectively absorb $SO_2$. Limestone D is supplied to the neutralizing unit 23 through a limestone supplying pipe 12. The separator 31 may be omitted if the quality of collected gypsum is not important.

According to this process, while the absorbing liquid is neutralized by the limestone particles in the neutralizing unit 23, the neutralizing effect of the limestone D is impaired if the gypsum particles are deposited on the surfaces of the limestone particles. Accordingly, the surfaces of the limestone particles in the neutralizing unit 23 are preferably renewed by the liquid. The absorbing liquid containing limestone D should be agitated slowly but continuously, for example, by means of the wet kiln 26 (FIG. 12) or a tank provided with the stirrer 25 (FIG. 11) or by fluidizing the limestone D with liquid or gas.

Using the desulfurization plant of this example shown in FIG. 19, a desulfurizing test was carried out. The $SO_2$ concentration in the exhaust gas A at the inlet of the desulfurization tower was 1,000 ppm. Limestone (having an average particle diameter of 1 mm) was loaded in advance in the neutralizing unit 23 in an amount equimolar to the $SO_2$ in the exhaust gas, i.e., an amount enough to desulfurize for five hours, and further supplied in an amount providing a molar ratio of 0.97 based on $SO_2$ in the exhaust gas, through the supplying pipe 12. The amount of air B blown into the circulation tank 6 was 30 times the molar equivalent of $SO_2$ in the exhaust gas. Sodium formate was supplied to the absorbing liquid through a pipe 41 to provide a predetermined concentration in the liquid.

Figure 20:
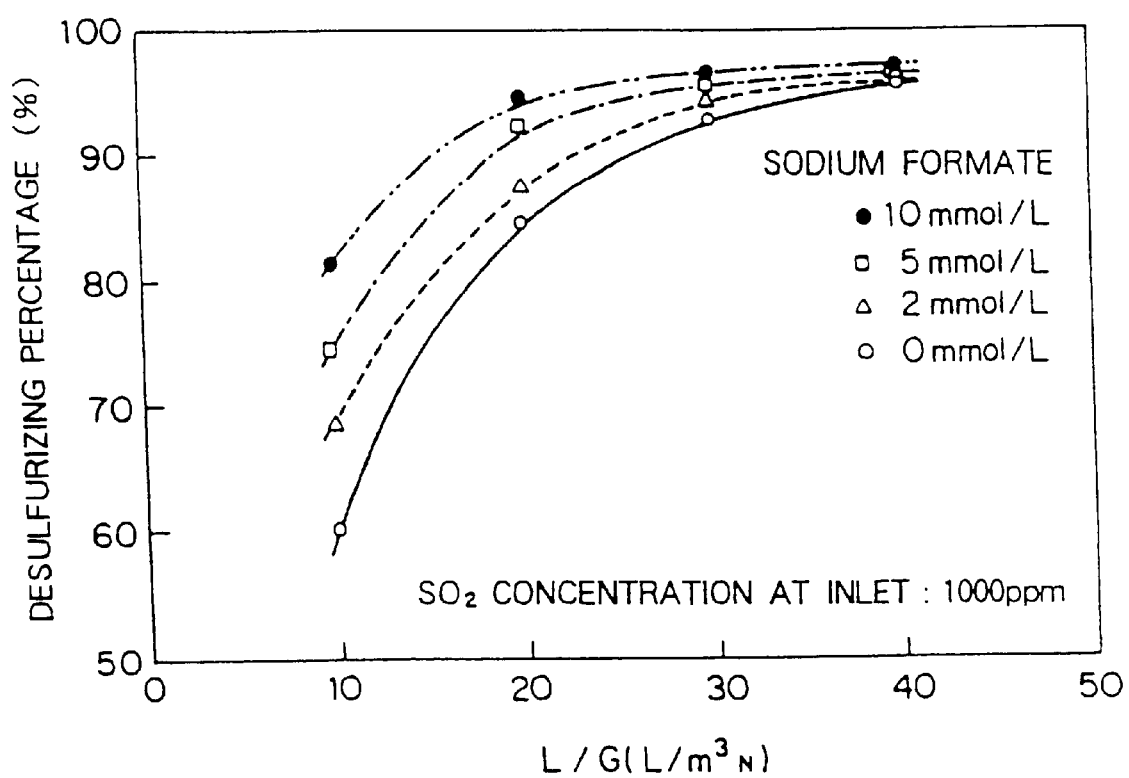
FIG. 20 is a graph illustrating the relationship between liquid-gas ratio (L/G) (i.e., ratio in amount of sprayed absorbing liquid to exhaust gas) and desulfurizing rate when concentration of sodium formate in absorb-ng liquid is changed in Example 7.

FIG. 20 shows the relationship between liquid-gas ratio (i.e., ratio of amount of sprayed absorbing liquid to exhaust gas; hereinafter referred to as L/G) and the desulfurizing percentage for different levels of sodium formate concentration in the absorbing liquid. At a constant L/G ratio, the desulfurizing percentage increases with an increase in the sodium formate concentration.

EXAMPLE 8

Figure 21:
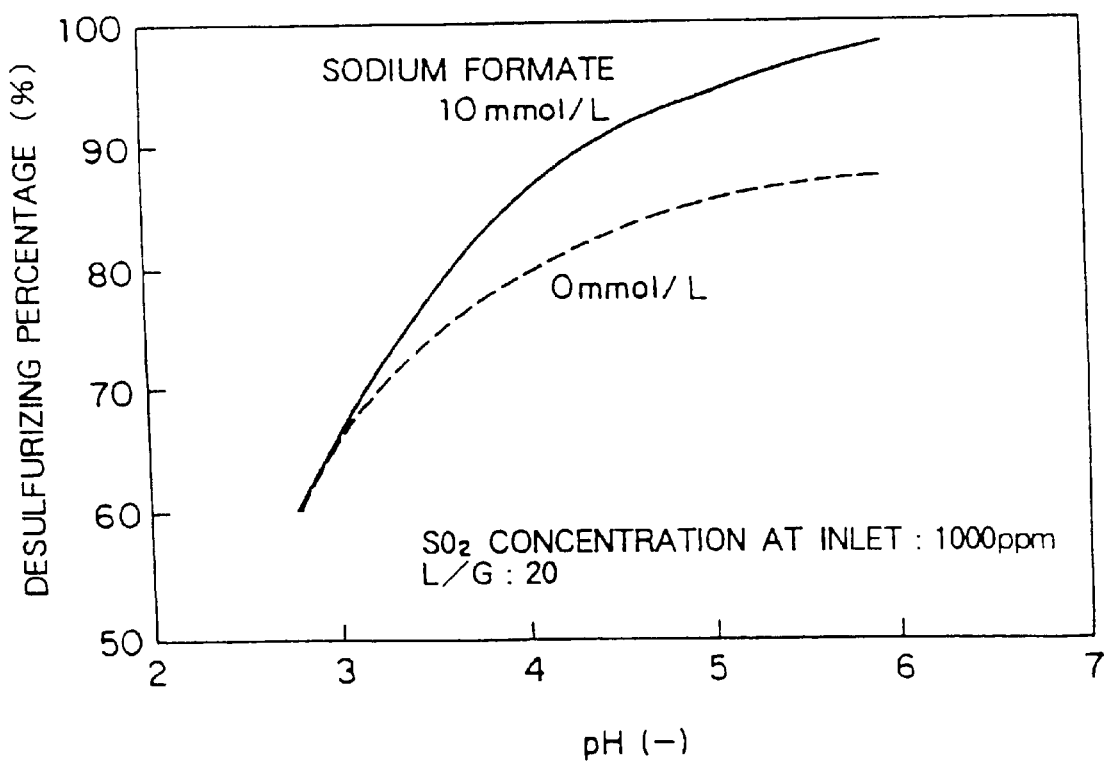
FIG. 21 is a graph illustrating a change in desulfurizing rate when pH of absorbing liquid at an exit of an neutralizing device is adjusted by changing the amount of limestone in Example 8.

A desulfurizing test was carried out under the same conditions as in Example 7 except that the pH value of the absorbing liquid at the outlet of the neutralizing unit 23 was adjusted by changing the amount of limestone in the neutralizing unit 23. FIG. 21 shows the relationship between pH and the desulfulizing percentage when the L/G ratio and the sodium formate concentration are constant. The effect of sodium formate is little observed at a pH value less than 3.2. The test results show that, with sodium formate and other carboxylates, a higher desulfurizing percentage can be obtained by controlling the amount of limestone and the liquid flow velocity in the neutralizing unit 23 to keen the pH of the absorbing liquid at the outlet of the unit 23 at a higher value than the dissociation constant $pK_a$ of the added carboxylates.

Although the neutralizing unit 23 is arranged outside of the desulfurization tower in Example 7, the absorbing liquid sprayed into the desulfurization tower may be collected in the bottom of the circulation tank 6, below the absorbing zone, to generate an upward flow through the limestone layer as shown in FIGS. 1 and 2 (Example 1) so as to fluidize the limestone particles in the absorbing liquid, with neutralization thereof. A pipe for supplying a carboxylic acid or a salt thereof to the absorbing liquid may be provided at an upper portion of the limestone layer 19 (FIG. 1, etc.) so as to provide predetermined concentration of sodium formate in the absorbing liquid. Further, sodium formate may be supplied to the absorbing liquid through introducing pipe 15 shown in FIGS. 1 and 2. An upward flow of the absorbing liquid through the limestone layer 19 is thus generated in the circulation tank 6. In this example the stirrer 25 shown in FIG. 11 and accessories, instrumentation and power related thereto are not necessary.

Although an upright desulfurization tower is used in this example, a horizontal (crosswise) type flue gas desulfurization plant in which the flow path of the exhaust gas is horizontal as shown in FIG. 18 is also effectively used in the present invention. In this case, a pipe for supplying a carboxylic acid or a salt thereof to the absorbing liquid may be arranged at an upper portion of the layer of the limestone particles (limestone layer 13 in FIG. 18) so as to provide a predetermined concentration of sodium formate in the absorbing liquid.

The solid desulfurizing agent is not required to be ground because the coarse limestone, etc. used herein as such an agent, is to be separated from the solid neutralization product particles such as gypsum (usually, average particle diameter of 20 to 100 μm), facilitated by the coarseness thereof (average particle diameter of 0.5 mm or more). Desulfurizing performance is enhanced because a large amount of limestone can be loaded in the neutralizing unit to yield a solid neutralization product of improved quality because of less contamination of the product particles. Further, the desulfurizing performance is improved by addition of carboxylates. Carboxylic acids and/or salts thereof used herein include acids such as formic acid, acetic acid, etc. and/or salts thereof.

EXAMPLE 9

This example is an improvement of the plant of Example 1 shown in FIGS. 1 and 2.

With the apparatus shown in FIG. 1, fine grinding facilities for limestone D and grinding power are not required and the gypsum C produced has high quality. However, when operation of the desulfurization plant is stopped and then restarted, the problem arises that the desulfurizing performance is reduced for a certain period of time (tens of minutes to several hours) after the stoppage of operation.

Figure 22:
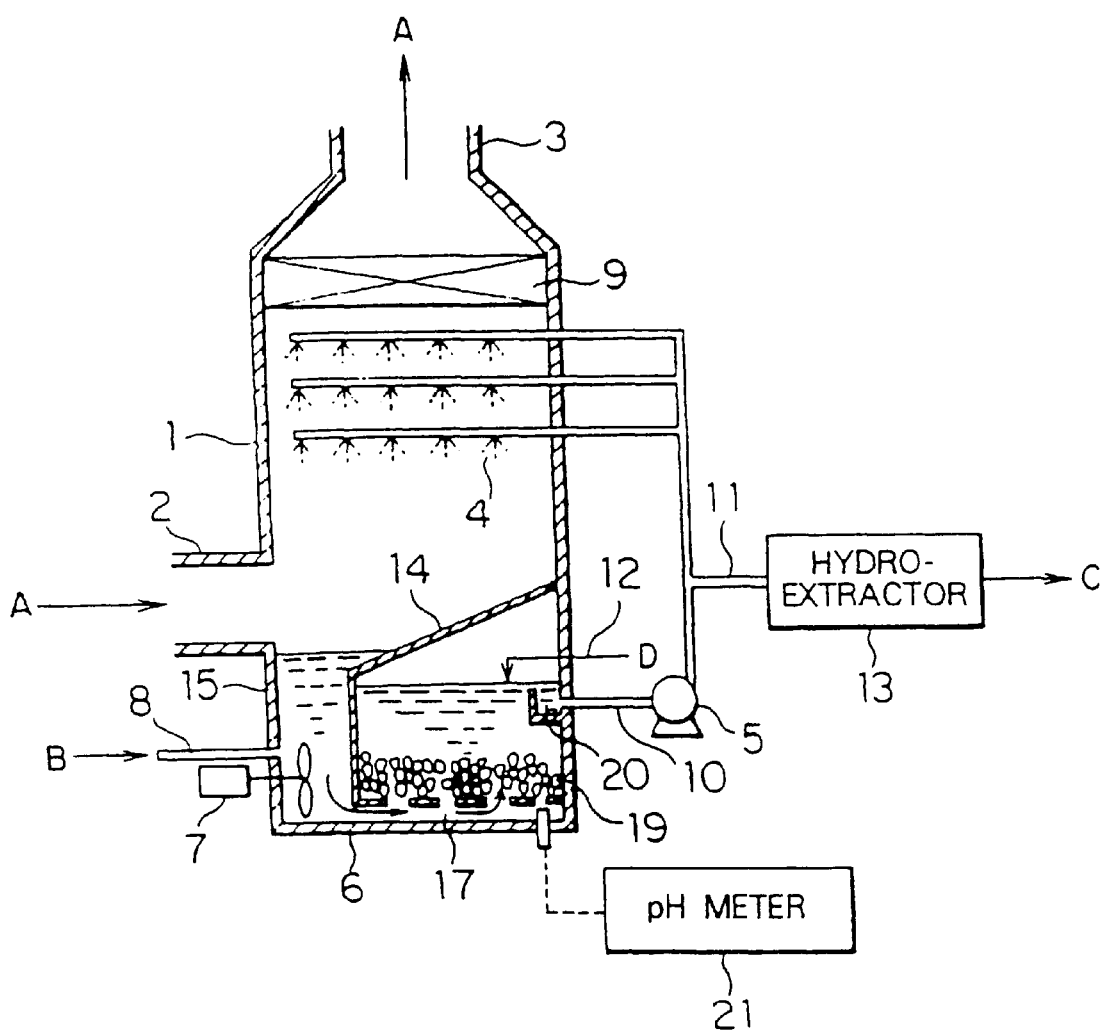
FIG. 22 is a flow-sheet of a flue gas desulfurization plant provided with a pH meter used in Example 9.

The flue gas desulfurization plant used in this example is shown in FIG. 22, in which apparatus components functioning in a manner similar to those shown in FIG. 1 are referenced by the same numerals and description thereof is omitted. The desulfurization plant of this example is further provided with a pH meter 21 for determining pH value of the absorbing liquid in dispersing pipe 17. In this example, the absorbing liquid is allowed to circulate in a desulfurization tower even after a feed of exhaust gas from a boiler is stopped and the operation of the desulfurization plant is stopped when a pH of 5.5 is confirmed by means of the pH meter 21 arranged in the dispersing pipe 17.

Using limestone having an average particle diameter of 2 mm, a desulfurizing test was carried out in the plant according to this example. The $SO_2$ concentration in the exhaust gas A at the inlet of the desulfurization tower was 1,000 ppm.

Figure 23:
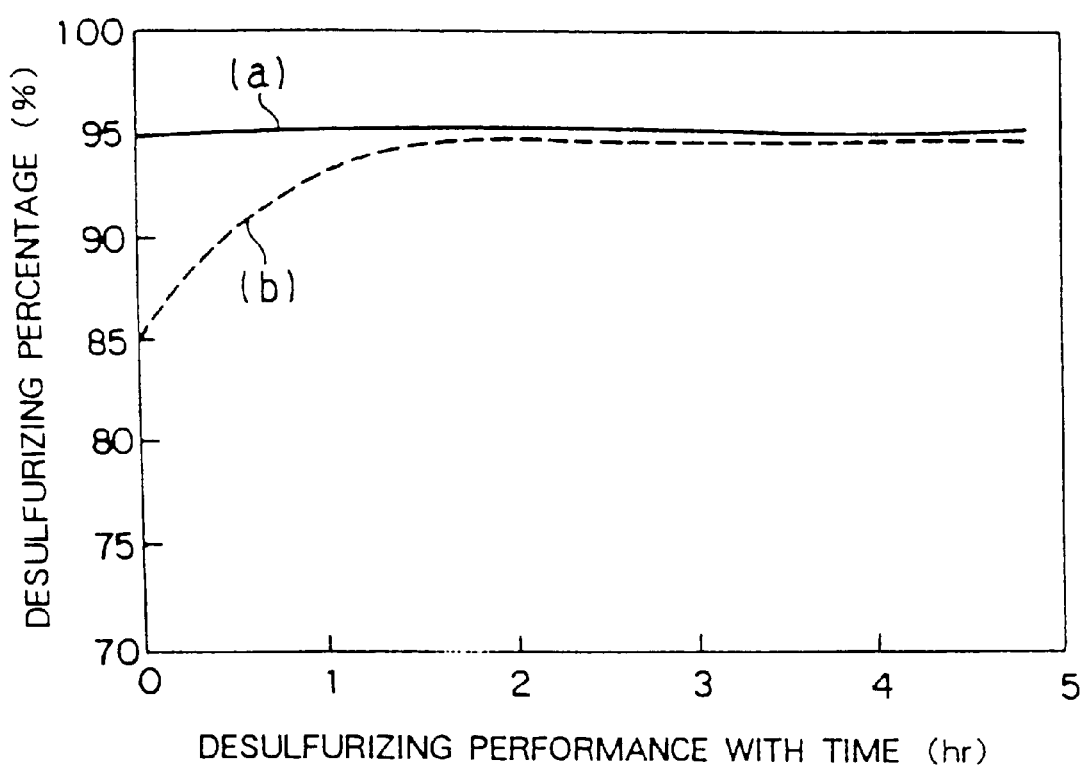
FIG. 23 is a graph illustrating the relationship between operation time of a desulfurization plant and a desulfurizing rate, a full line (a) and a broken line (b) showing the relationship between the operation time and the desulfurizing rate in Example 9 and Comparative Example 3, respectively.

A change in the desulfurizing percentage with time is shown by a full line (a) in FIG. 23 wherein the absorbing liquid was allowed to circulate in the desulfurization tower even after feed of exhaust gas A from a boiler was stopped, while the operation of the desulfurization plant was stopped when the pH meter 21 arranged in the dispersing pipe 17 indicated a value of pH 5.5 and was restarted again after 24 hours passed. It is observed that stable desulfurizing performance is obtained even after the restart of operation.

COMPARATIVE EXAMPLE 3

Using the same plant as Example 9, the desulfurizing performance after the restart of operation was tested. In this comparative example, circulation of the absorbing liquid in the desulfurization tower was stopped immediately after feed of the exhaust gas A from the boiler ceased. A change in the desulfurizing performance with time is shown by a broken line (b) in FIG. 23, wherein the operation was restarted after 24 hours had passed. It is observed that a lower desulfurizing percentage continues for one hour or more after the restart of operation.

EXAMPLE 10

Figure 24:
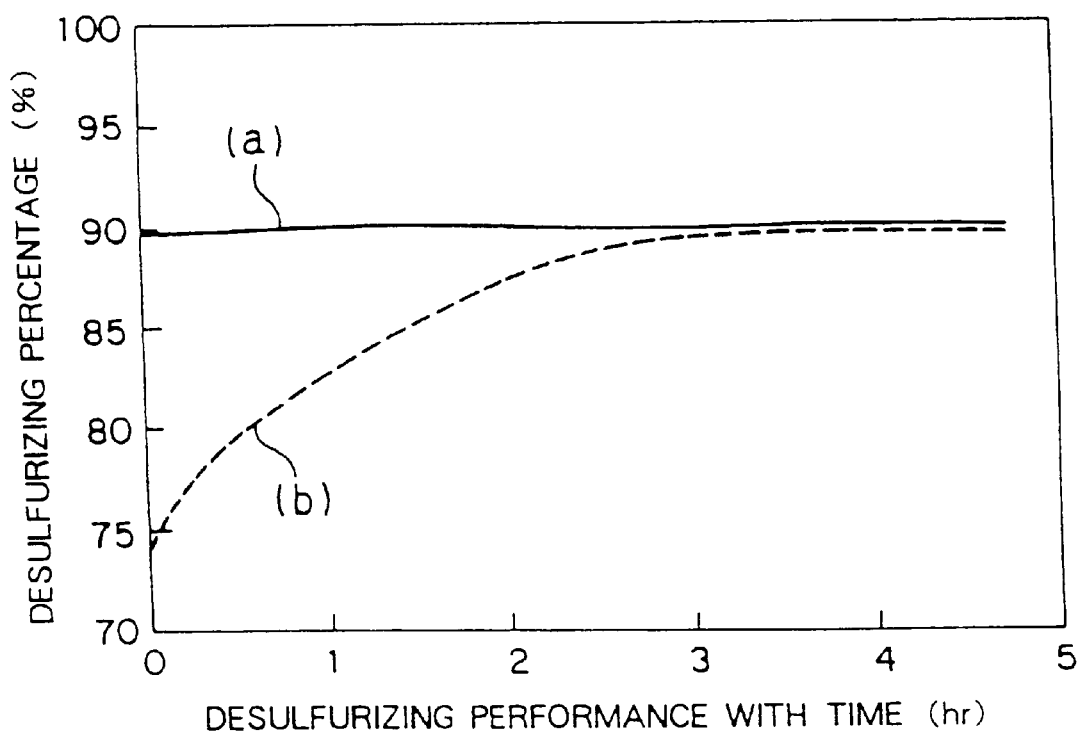
FIG. 24 is a graph illustrating the relationship between operation time of a desulfurization plant and a desulfurizing rate, a full line (a) and a broken line (b) showing the relationship between the operation time and the desulfurizing rate in Example 10 and Comparative Example 4, respectively.

A desulfurizing test was carried out using the same plant and conditions as Example 9 except that the $SO_2$ concentration in the exhaust gas A at the inlet of the desulfurization tower was 3,000 ppm. The result obtained is shown by a full line (a) in FIG. 24. It is observed that stable desulfurizing performance is obtained even after the restart of operation.

COMPARATIVE EXAMPLE 4

A desulfurizing test was carried out using the same plant and conditions as Comparative Example 3 except-that the $SO_2$ concentration in the exhaust gas A at the inlet of the desulfurization tower was 3,000 ppm. The result obtained is shown by a broken line (b) in FIG. 24. It is observed that a condition of lower desulfurizing percentage continues for two hours or more after the restart of operation.

The desulfurizing performance was further tested under different conditions other than those described above. As a result, it was confirmed that a higher $SO_2$ concentration in the exhaust gas A at the inlet of the desulfurization tower requires a longer recovery time for desulfurizing performance after the restart of operation in the conventional technology, as contrasted with the stable desulfurizing performance obtained after the restart of operation in Examples 9 and 10.

When the operation of the desulfurization plant used in Example 1 (FIG. 1) is stopped, $H_2SO_3$ and $H_2SO_4$ left in the absorbing liquid are reacted with limestone in a neutralization reaction, during a stoppage of the operation, in accordance with reaction (3) previously described or the following reaction:

$$H_2SO_3+CaCO_3=CaSO_3 \cdot 1/2H_2O+CO_2$$

It is believed that $CaSO_3$ (calcium sulfite) and gypsum C thus formed are deposited on the surfaces of the limestone D to lower the reactivity thereof, thereby deteriorating the desulfurizing performance upon the restart of operation. It is also believed that calcium sulfite and gypsum C are removed from the surface of limestone D by fluidization of the limestone in the absorbing liquid or by mutual collision thereof presently after the operation is restarted, whereby the desulfurizing performance is recovered. On the other hand, in examples 9 and 10, the absorbing liquid is allowed to circulate even after introduction of the exhaust gas from the boiler is ceased and then the operation of the desulfurization plant is stopped, for example, after the pH value of the absorbing liquid entering the neutralizing zone (absorbing liquid in the dispersing pipe 17 in FIG. 22) reaches a predetermined level (usually 4.0 to 6.0 or more). Accordingly, stable desulfurizing performance can be obtained without deposition of calcium sulfite and gypsum C on the surfaces of limestone D and without deterioration of the desulfurizing performance after the restart of operation because $H_2SO_3$ or $H_2SO_4$ does not exist in the absorbing liquid during stoppage of the operation.

In examples 9 and 10, limestone is selectively left in the neutralizing zone by reason of a difference in the rate of settling caused by the different particle diameters of limestone and gypsum, but the two components may also be separated, for example, by means of a mesh or by utilizing a difference in inertia force or the like.

EXAMPLE 11

Figure 25:
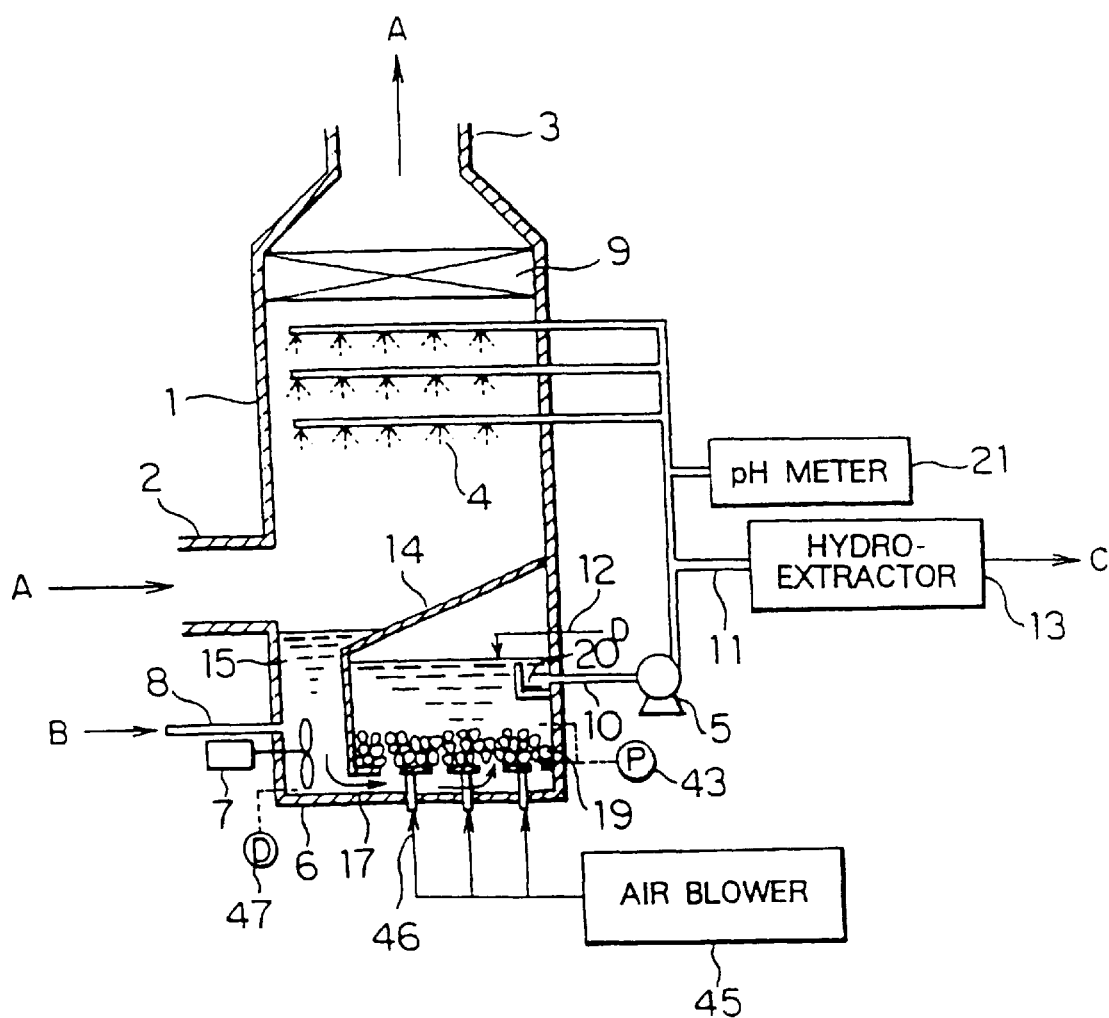
FIG. 25 is a schematic view of a desulfurization plant in which air is blown into the limestone layer used in Example 11.
Figure 26:
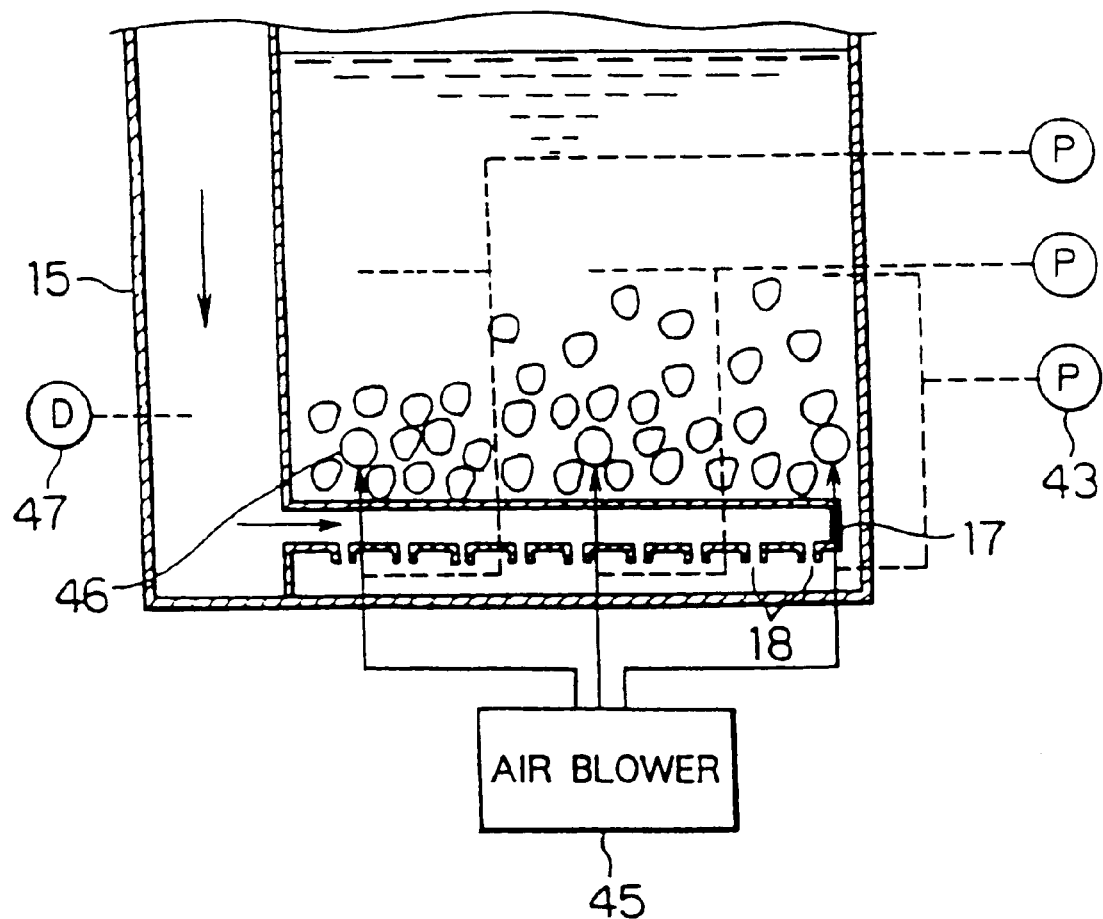
FIG. 26 is an enlarged view of the neutralizing zone shown in FIG. 25.

The desulfurization plant used in this example is shown in FIGS. 25 and 26 (the latter is an enlarged view of a zone for neutralizing the absorbing liquid by limestone). In FIGS. 25 and 26, equipment components which function similar to those shown in FIG. 1 are referenced by the same numerals and description thereof is omitted. The desulfurization plant of this example is further provided with a pressure gauge 43 for measuring pressure drop across a fluidized limestone layer 19, an air blower 45 for blowing gas such as air into the limestone layer 19 and air blowing holes 46.

The absorbing liquid with absorbed $SO_2$ from the exhaust gas is allowed to drop onto a absorbing liquid collecting plate 14 and led to the bottom of a circulation tank 6 through an introducing pipe 15. On the way, sulfurous acid contained in the absorbing liquid is oxidized to sulfuric acid. The absorbing liquid dispersed from plural dispersing holes 18 arranged on a dispersing pipe 17, which is connected to the bottom of the introducing pipe 15, and air blown from the air blowing holes 46 are jetted together homogeneously and vigorously through all supplying holes to generate an upward flow. Limestone and sulfuric acid are reacted in the fluidized limestone layer 19 to form gypsum.

The absorbing liquid thus neutralized for recovery of a predetermined pH value is recycled from an outlet 20 at an upper portion of the circulation tank 6 to spray nozzles 4 through an absorbing liquid draining pipe 10 to selectively absorb $SO_2$. A difference between pressures at the bottom and the top in the circulation tank 6 is measured at plural locations by means of the pressure gauge 43. Air is blown into locations where the pressure difference is smaller than a predetermined value through the air blowing holes 46 of the air blower 45, to accelerate fluidization of the less fluidized portions of the limestone layer 19. Water may be injected instead of air.

When vertical partitions (not shown) are arranged between the dispersing pipes 17 to separate each dispersing pipe 17 so as to form a fluidized bed of the limestone layer 19 within each of a plurality of divided neutralizing zones, such independent fluidization in each division makes it easy to adjust for less fluidization within a portion of the limestone layer 19.

Further, when a gravimeter 47 for measuring specific gravity of the absorbing liquid is arranged in the introducing pipe 15, height of the limestone layer 19 can be obtained from the following formula by measuring both pressure drop (P) across the fluidizing limestone layer 19 and specific gravity of the absorbing liquid by means of the gravimeter 47 together with the pressure gauge 43:

$P$=(specific gravity of limestone−specific gravity of absorbing liquid)×(height of limestone layer)×(1−porosity)

Using limestone having an average particle diameter of 2 mm in the plant of this example, a desulfurizing test was carried out. The $SO_2$ concentration in the exhaust gas A at the inlet of a desulfurization tower was 1,000 ppm. The difference in depth of liquid was found to be 2 m by measurement of the difference in pressure between the bottom and the top of a circulation tank 6. Air was blown from the air blower 45 through the air blowing holes 46 into portions where the difference in pressure due to the fluidization of limestone D was 0.05 kg/cm$_2$ or less after the difference in pressure due to the difference in liquid depth of 0.2 kg/m$^2$ was subtracted therefrom so as to adjust the pressure drop due across the fluidized limestone D to 0.1 kg/cm$^2$ or more.

Figure 27:
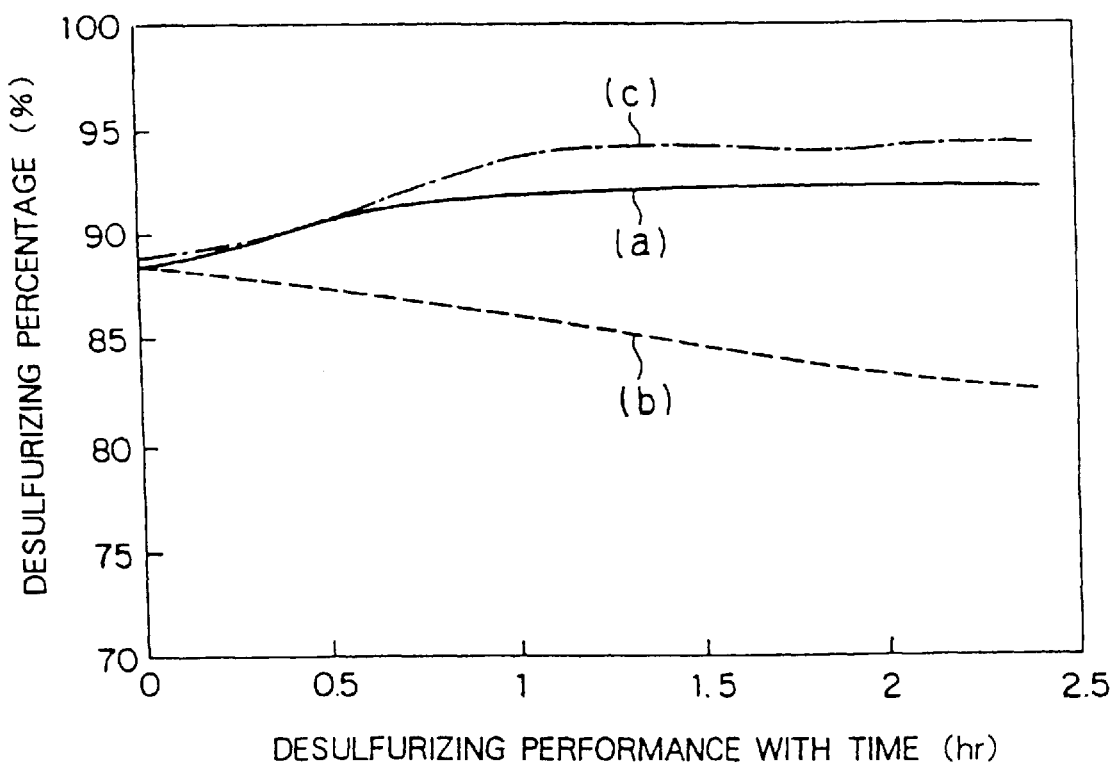
FIG. 27 is a graph illustrating change in desulfurizing rate of a desulfurization plant with time, a full line (a) showing the change when an desulfurization plant used in Example 11 is halted after operation for a certain period of time and then restarted, a broken line (b) showing a similar change in a conventional plant (shown in FIG. 39) used in Comparative Example 5 and a chain dash (c) showing a similar change in Example 12 when air is continuously blown into an limestone layer.

A change in the desulfurizing percent with time is shown by a full line (a) in FIG. 27 when operation of the desulfurization plant is stopped for a certain period of time and then restarted. While the desulfurizing percentage is low because the fluidization of the limestone D is not homogeneous throughout the limestone layer 19 immediately after the restart of operation, the desulfurizing percentage is improved when the extent of fluidization is homogenized throughout the layer by blowing air thereinto (height of the limestone layer is rendered nearly even), and kept stable after that. Further, the injected air results in the fluidization of limestone D after the restart of operation which contributes to an increase in the reactivity thereof. A similar effect is obtainable when water is introduced through the holes 46 instead of air.

Instead of the direct blowing of gas such as air into the limestone layer 19, it is also possible to supply gas together with the absorbing liquid into the limestone layer 19 by blowing gas in through introducing pipe 15, branch pipe 16 and dispersing pipe 17 so as to render the height of the limestone layer 19 nearly even as a whole.

COMPARATIVE EXAMPLE 5

Using a conventional plant as shown in FIG. 39, the desulfurizing performance after the restart of operation was tested under the same conditions as in Example 11. A change in the desulfurizing percentage with time is shown by a broken line (b) in FIG. 27. The desulfurizing percent is substantially lower and decreases with the elapse of time. As a reason for this, it is assumed that the height of the limestone layer is rendered increasingly uneven throughout the layer with the lapse of time.

EXAMPLE 12

The desulfurizing performance was tested using the same plant and under the same conditions as in Example 11 except that air was blown therein continuously over a period of testing through holes 46 arranged evenly all over the bottom of the circulation tank 6. The amount of air thus introduced was 1 vol. of the exhaust gas. A change in the desulfurizing percentage with time is shown by a chain line (c) in FIG. 27. The desulfurizing percentage under normal conditions is 94% which is higher than that achieved in Example 11. It is considered that $CO_2$ in the absorbing liquid is expelled by air to promote the neutralization reaction of ($H_2SO_4 + CaCO_3 + H_2O = CaSO_4 \cdot 2H_2O + CO_2$).

EXAMPLE 13

Figure 28:
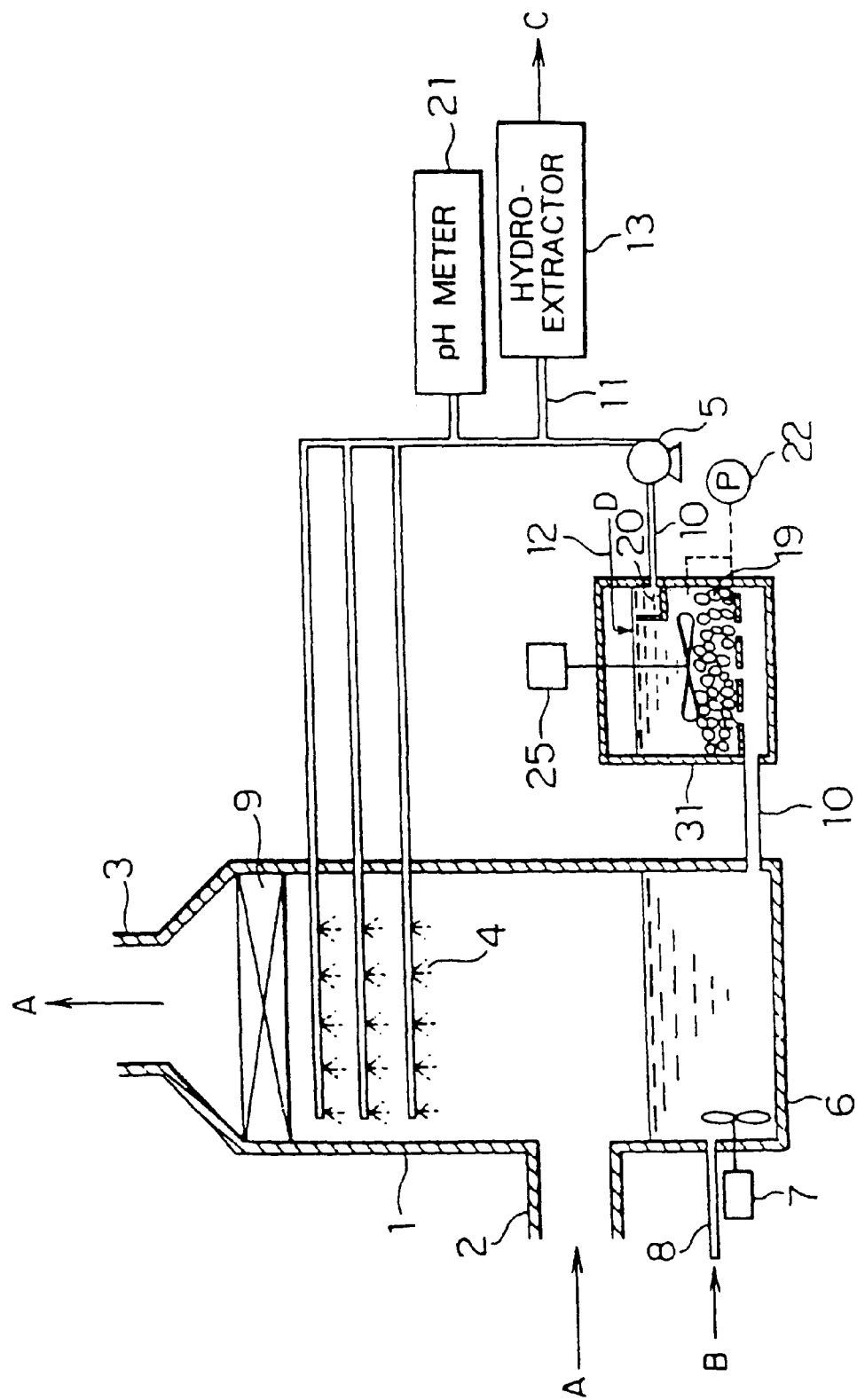
FIG. 28 is a schematic view of a desulfurization plant used in Example 13 in which a neutralizing zone is provided external to a main desulfurizing tower body and in which the limestone layer is stirred by a stirrer so as to level the layer.

In Example 12, the height of the limestone D layer is rendered nearly even as a whole because of the structure in which the limestone is fluidized in the circulation tank 6 and the air injection. On the other hand, it is also possible to render the height of the limestone D layer nearly even as a whole by means of a neutralizing unit 23 arranged independently from tower body 1 and connected to a circulation tank 6 through a connecting pipe 10 while agitating limestone layer 19 in the neutralizing unit 31 by a stirrer 25 and flowing the absorbing liquid fed from the circulation tank 6 upward from the bottom of the neutralizing unit 31 as shown in FIG. 28.

EXAMPLE 14

A flue gas desulfurization plant as shown in FIG. 1 was used in this example. However, as shown in the partial sectional view of FIG. 29, this plant is further provided with vertical pipes 49 extending downward, connecting to the dispersing pipe 17, which is shown in FIGS. 2 and 4, and having an open outlet or dispersing holes 18 at each end thereof. A cone baffle plate 50 is arranged under each vertical pipe 49 to rectify the absorbing liquid jetting out of the outlets 18. Because of a vertical velocity distribution of the absorbing liquid (the velocity increases in the downward direction), the velocity of the absorbing liquid is kept high in a bottom portion in the circulation tank 6 by the cone baffle plates 50 even if the velocity of the absorbing liquid jetting out of the outlets 18 is decreased, thereby easily fluidizing the limestone particles.

Figure 30:
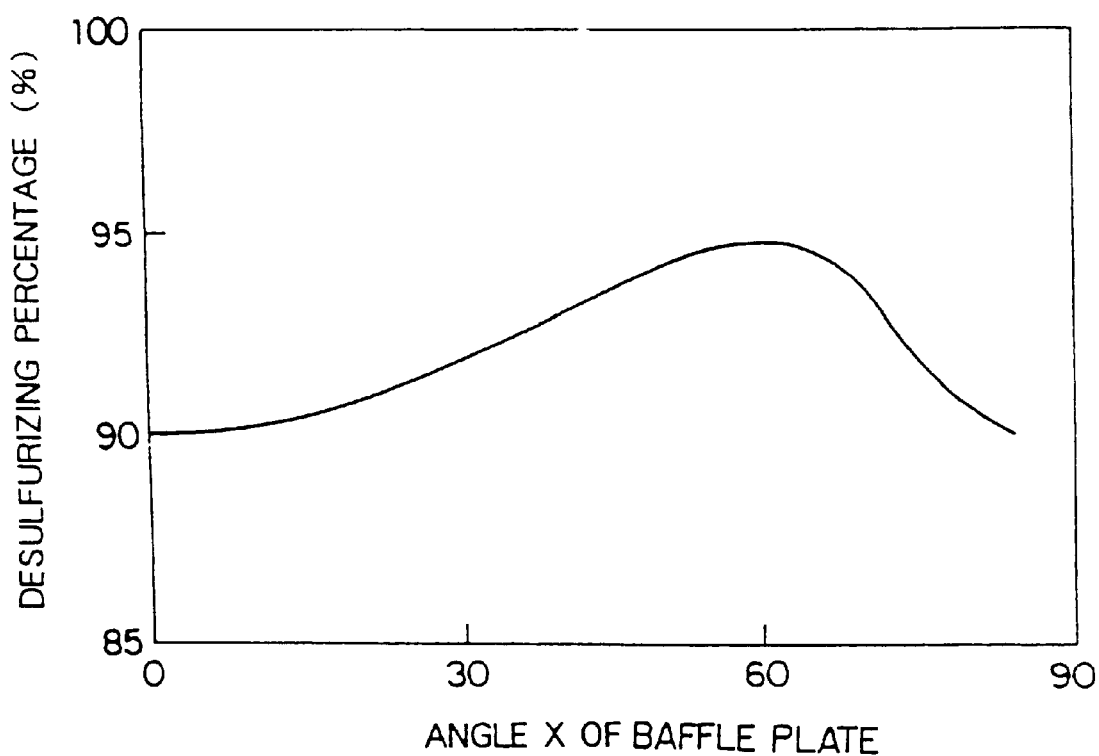
FIG. 30 is a graph illustrating the relationship between (1) the angle X between the baffle plates and bottom of the circulation tank in FIG. 29 and (2) desulfurizing rate in Example 14.

Using limestone having an average particle diameter of 2 mm in the plant according to this example, a desulfurizing test was carried out. The $SO_2$ concentration in the exhaust gas A at the inlet of an desulfurization tower was 1,000 ppm. The relationship between the angle X between the cone baffle plate 50 and the bottom plane of the circulation tank 6 and the-desulfurizing percentage is shown in FIG. 30. The angle X preferably falls in a range of 30 to 70° according to the desulfurizing percentage in the graph.

Figure 29:
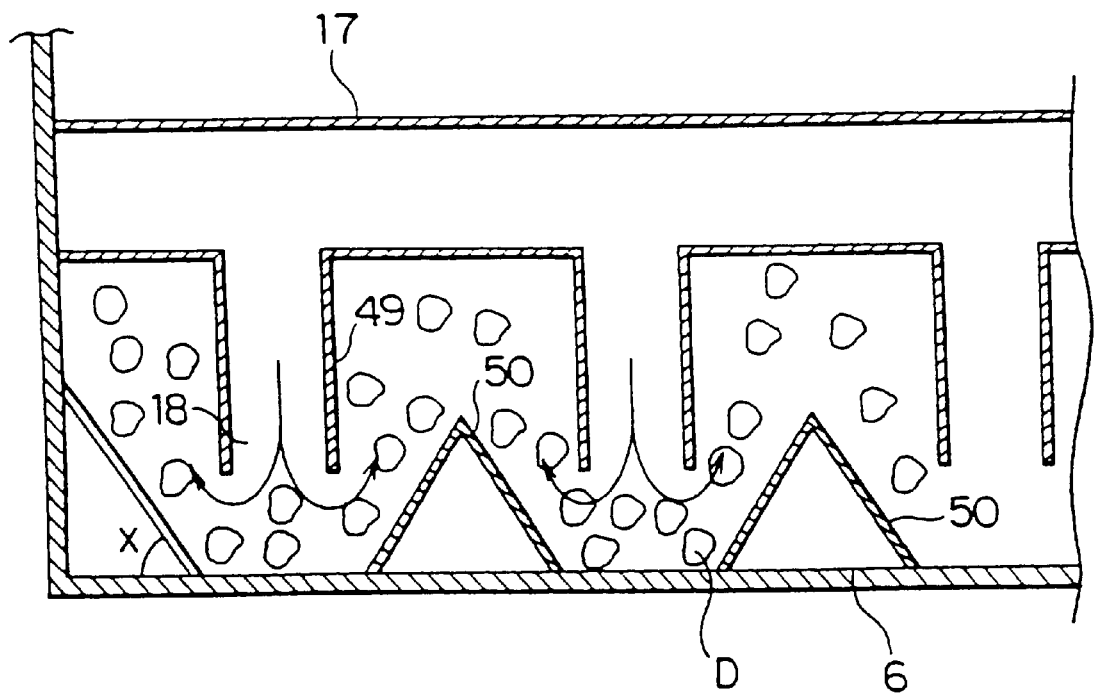
FIG. 29 is an enlarged view of the bottom portion of the circulation tank used in Example 14 in which cone baffle plates are arranged between downward extending vertical pipes fixed to a dispersing pipe.
Figure 31:
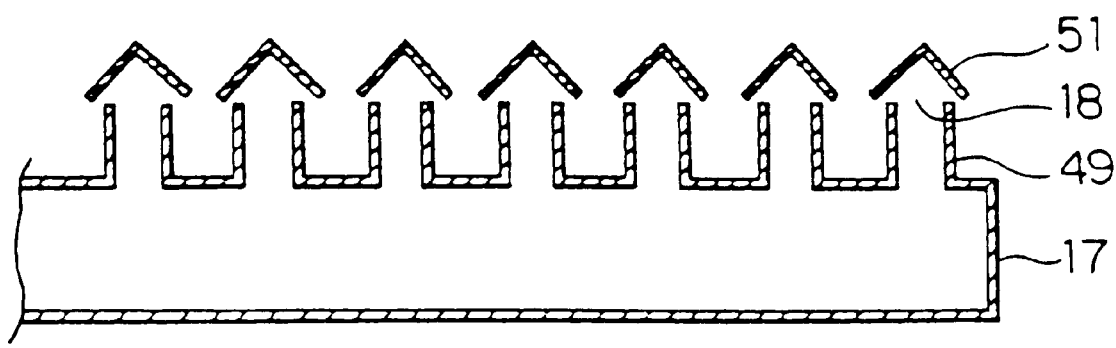
FIG. 31 is a modification of Example 14 in which cone baffle plates are arranged above upward extending vertical pipes fixed to a dispersing pipe.
Figure 32:
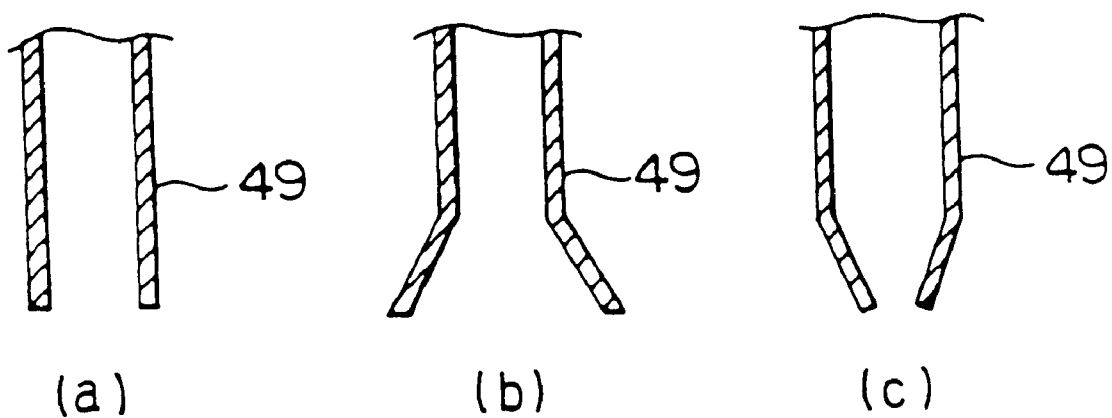
FIGS. 32(a), 32(b) and 32(c) are sectional views of distal ends of vertical pipes in Examples 30 or 31.

It is also possible to arrange vertical pipes 49 extending upward from the dispersing pipe 17 as shown in FIG. 31 in which each vertical pipe 49 is provided with an outlet 18 at the top end thereof and a cone baffle plate 51 above it, the cone baffle being arranged upside down with respect to those shown in FIG. 29, to prevent back flow of the limestone particles into the dispersing pipe 17 and to provide homogeneous flow of the absorbing liquid from the outlets 18 into the neutralizing zone. Further, the vertical pipes 49 may be provided with distal ends of various shapes as shown in FIG. 32.

EXAMPLE 15

In the desulfurization plant used in this example, a neutralizing tank 23 is arranged independently from circulation tank 6 in which only a part of the collected absorbing liquid is recirculated to spray nozzles 4 and the remaining part thereof is circulated to the neutralizing unit 23 as shown in FIG. 33. In this case, it is possible to independently maintain and control each of absorbing liquid circulation systems feeding the neutralizing unit 23 and the spray nozzles 4, respectively. Accordingly, if one of these circulation systems is broken down, the other working system can be used to continue operation for a while. As has been described in Examples 9 and 10, pH control of the absorbing liquid in the neutralizing zone is easy when the operation of the flue gas desulfurization plant is stopped. That is, when only the neutralizing unit 23 is continuously operated for a while after the operation of the flue gas desulfurization plant is stopped, the neutralizing unit 23 can be easily stopped after a pH meter 21 indicates a pH of 5.5 for the absorbing liquid at the outlet of the neutralizing unit 23. When the flue gas desulfurization plant is restarted, it is also possible to operate the absorbing circulation system feeding the spray nozzles 4 after the pH value of the absorbing liquid in the neutralizing unit 23 is sufficiently increased.

Further, when a pipe by which the absorbing liquid is circulated through a wet cyclone (not shown) is connected to the neutralizing unit 23 at a point just upstream of dehydrator 13, limestone D of a larger particle diameter can be collected in the neutralizing unit 23 without loss to the hydroextractor 13.

EXAMPLE 16

Figure 34:
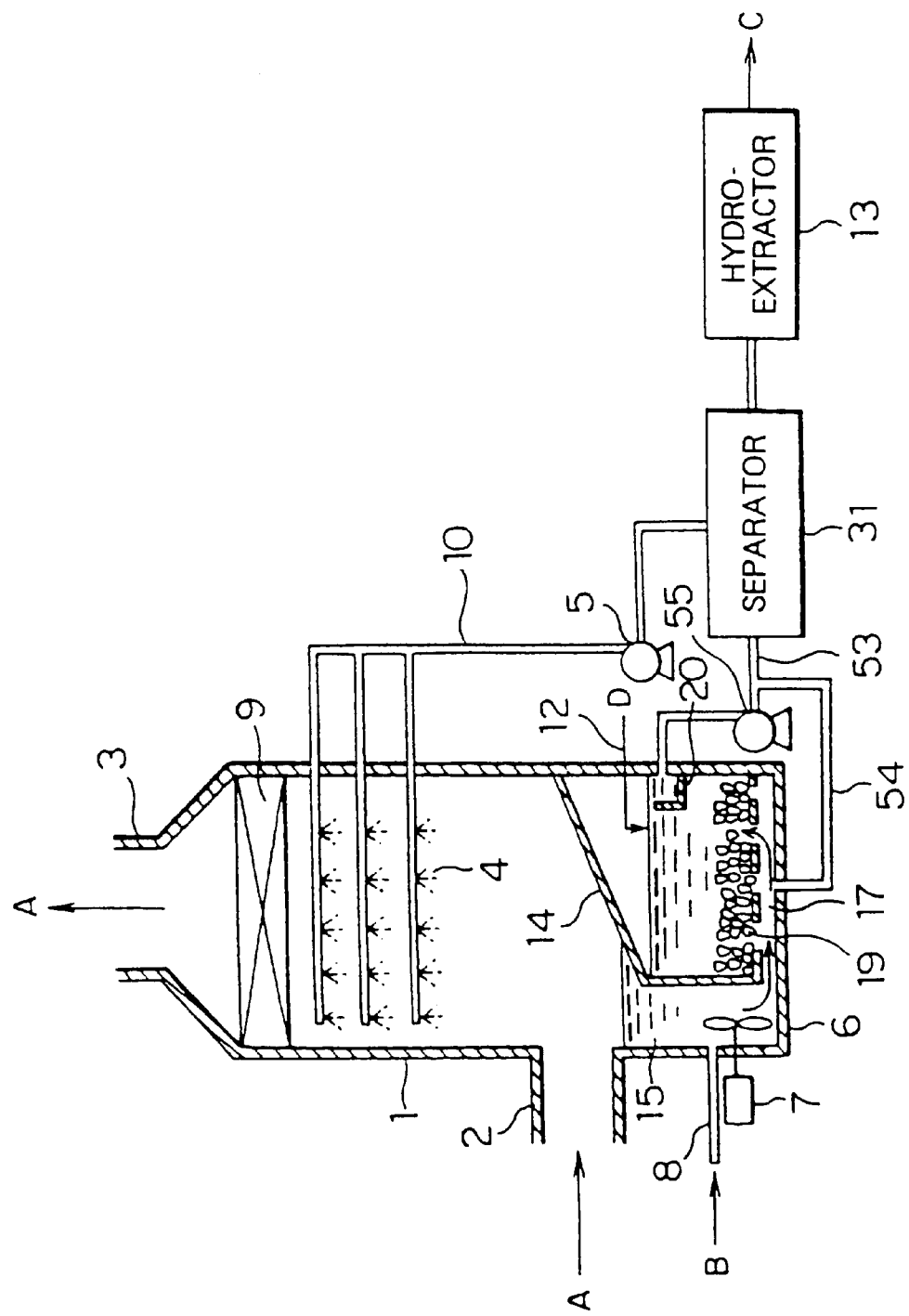
FIG. 34 is a schematic view of a desulfurization plant used in Example 16 including a by-pass line for returning absorbing liquid through the bottom of the circulation tank.

The desulfurizing system used in this example is shown in FIG. 34. In this example, a by-pass line 54 connects the bottom of circulation tank 6 and a circulation line 53. The by-pass line 54 is used to fluidize a limestone layer 19 when the desulfurization plant is started to operate, with the absorbing liquid being pumped from pump 55 to the circulation tank 6 directly, without passing through the spray nozzles 4. Since the limestone layer 19 is hydrostatically pressed until the operation of the desulfurization plant is stopped, higher pressure is required to fluidize the layer 19 when the plant is restarted. Pressure loss which must be overcome to pump the absorbing liquid to the spray nozzles 4 is canceled by the by-pass line 54, thereby easily fluidizing limestone D upon the restart. Once limestone D is fluidized, circulation of the absorbing liquid is changed from the by-pass line 54 to the circulation line 53 and operation may be continued, for example, following the process described in Example 1. According to this example, limestone D in the absorbing liquid is separated by means of a separator 31 followed by dehydration of the absorbing liquid, from which limestone D has thus been removed, by means of a hydroextractor 13 to collect gypsum C.

EXAMPLE 17

Figure 35:
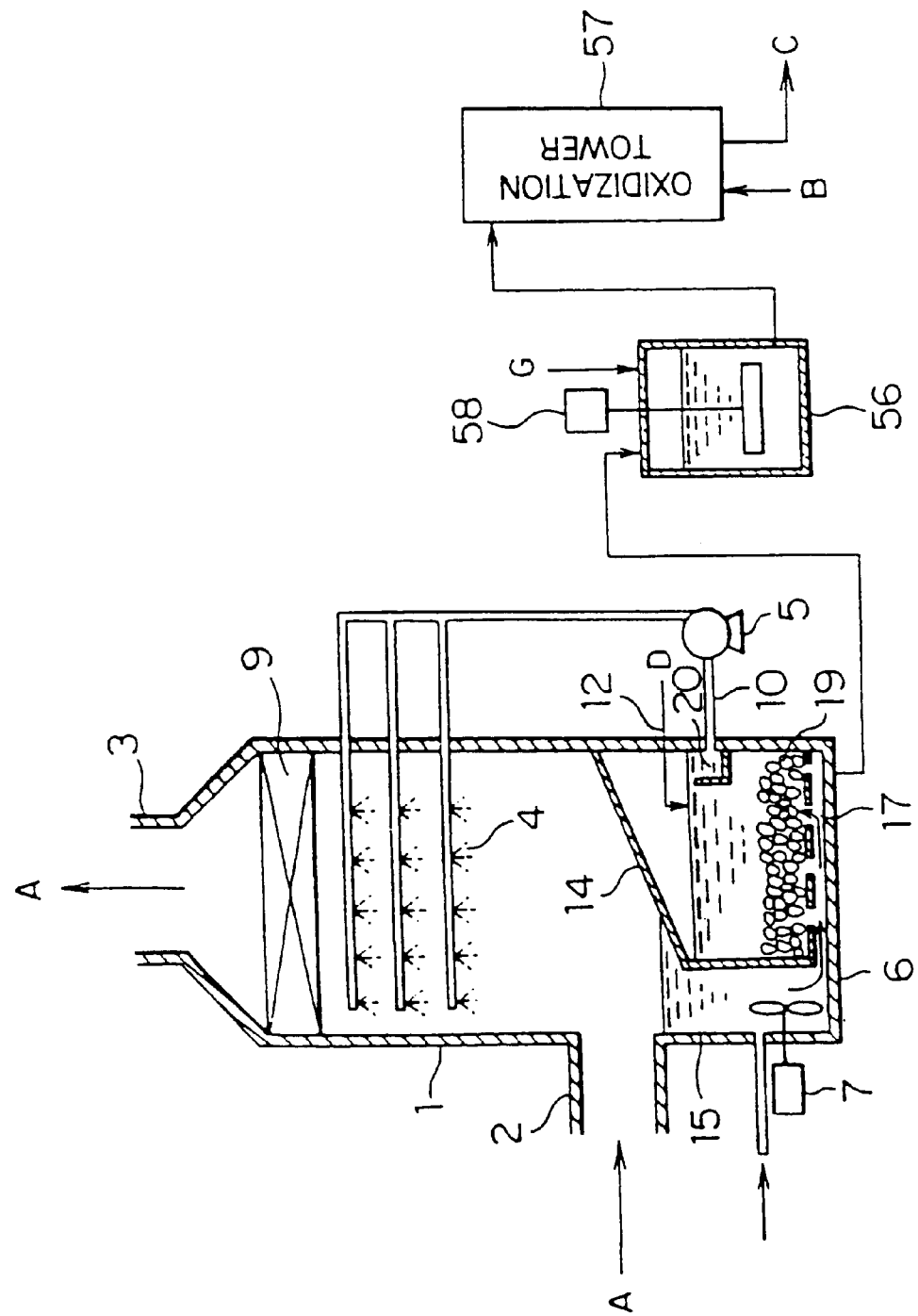
FIG. 35 is a schematic view of a desulfurization plant provided with an external oxidization tower as used in Example 17 in accordance with the present invention.
Figure 36:
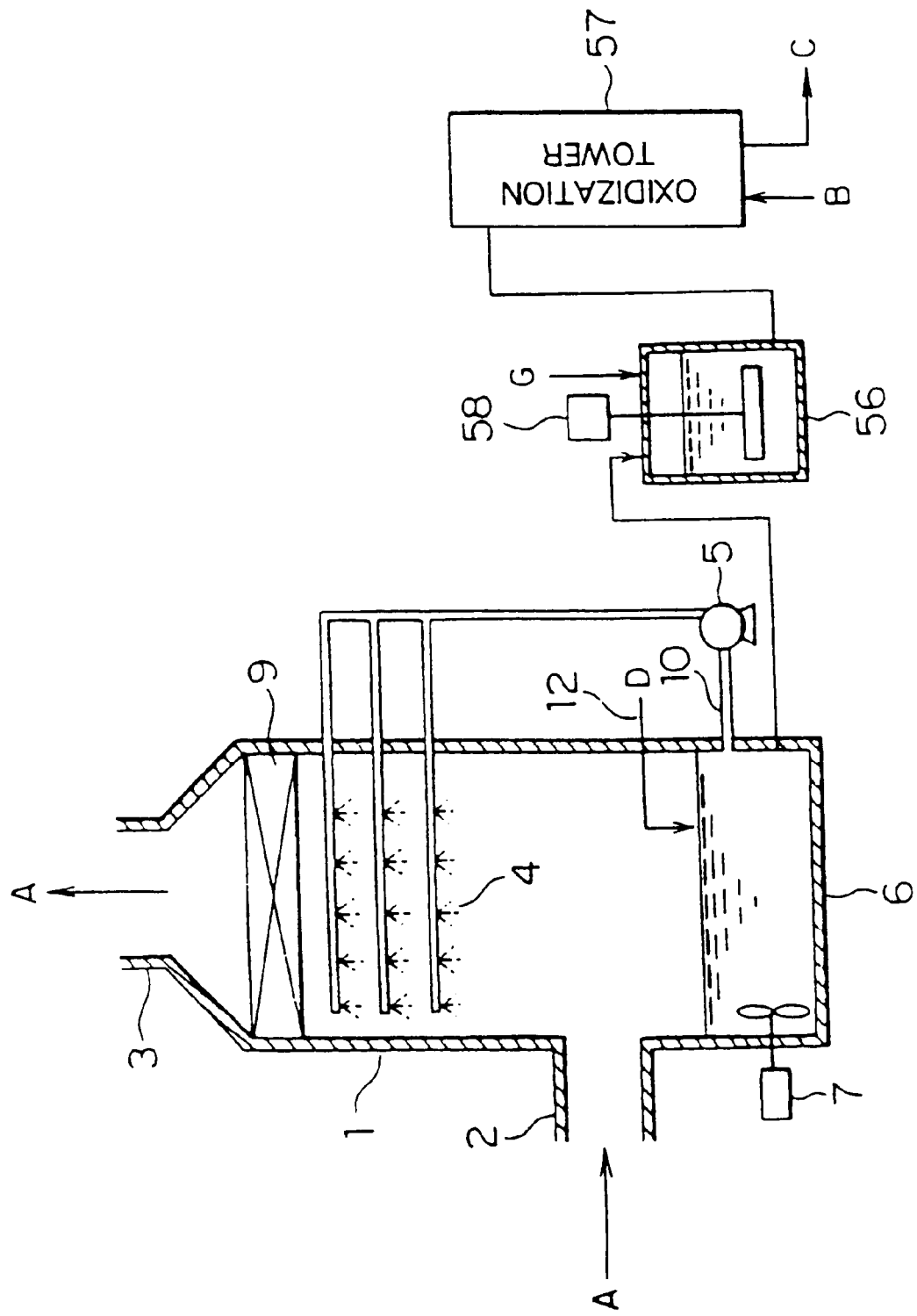
FIG. 36 is a schematic view of a conventional flue gas desulfurization plant provided with an external oxidizing tower.

The present invention is also applicable to a flue gas desulfurization plant provided with an external oxidization tower as shown in FIG. 35. In this embodiment, the desulfurization plant comprises three towers, i.e., a cooling tower for conducting cooling and dust-removal for the exhaust gas (not shown), a desulfurization tower 1 for spraying the absorbing liquid to react with $SO_2$ in the exhaust gas and an oxidation tower 57 for oxidizing calcium sulfite formed in the desulfurization tower 1. The main reactions occurring in this flue gas desulfurization plant provided with the external oxidation tower shown in FIG. 35 are described below. A conventional flue gas desulfurization plant provided with an external oxidization tower is shown in FIG. 36.

$SO_2$ in the exhaust gas A is absorbed by the absorbing liquid (main constituent: water) in the desulfurization tower 1 to form $H_2SO_3$ which is then reacted with calcium sulfite ($CaSO_3 \cdot 1/2H_2O$) contained in the absorbing liquid to form calcium hyposulfite ($Ca(HSO_3)_2$). Calcium hyposulfite is reacted with limestone in a neutralizing zone during passage through limestone layer 19 to form calcium sulfite. Calcium sulfite thus formed is recycled to spray nozzles 4 and reacted with $H_2SO_3$ which has been formed by absorption of $SO_2$ in the exhaust gas A. On the other hand, a part of the calcium sulfite is fed to a tank 56, where the pH value thereof is adjusted by adding sulfuric acid G with agitation by means of a stirrer 58, and then fed to the oxidization tower 57. Air (B) is supplied to the oxidation tower 57, whereby calcium sulfite is oxidized to form gypsum ($CaSO_4 \cdot 2H_2O$) as follows:

(Absorbing Reaction) $H_2O + SO_2 = H_2SO_3 CaSO_3 \cdot 1/2H_2O + H_2SO_3 = Ca(HSO_3)_2 + 1/2H_2O$ (Neutralizing Reaction) $Ca(HSO_3)_2 + CaCO_3 = CaSO_3 \cdot 1/2H_2O + CO_2$ (Oxidization Reaction) $CaSO_3 \cdot 1/2H_2O + 1/2O_2 + 3/2H_2O = CaSO_4 \cdot 2H_2O$ A large amount of limestone may be loaded to form the limestone layer 19 in the neutralizing zone and, generally, limestone D is loaded in an amount sufficient to cover about 20 hours of continuous operation. Such an amount of limestone is applicable to every example described above. Accordingly, if limestone D is loaded into the neutralizing zone all at once during night when the operation of the desulfurization plant is stopped, it is not necessary to supply limestone D in the daytime or to maintain operation of a grinder for limestone, etc. in the nighttime. In particular, as limestone is loaded when the operation of the desulfurization plant is stopped, it is not necessary to take measures for preventing deposition of wetted limestone D in supply pipe 12 of the desulfurization tower 1 when limestone D is loaded.

In order to supply limestone D of a predetermined particle diameter to the flue gas desulfurization plant, a rock raw material is ground by means of a grinder such as jaw-, hammer-, roll-crushers and the like and conveyed to the plant. However, such original limestone rock D' is generally available only at a site far from, for example, several kilometers away from, the plant. Accordingly, a raw material conveying system is employed in this example in which a grinder 61 is located either in the vicinity of the site (quarry) of the original limestone rock D' or the desulfurization tower 1 itself to connect the original limestone site D' and the tower body 1 by means of a belt conveyor 68 as shown in FIGS. 37 and 38.

Figure 37:
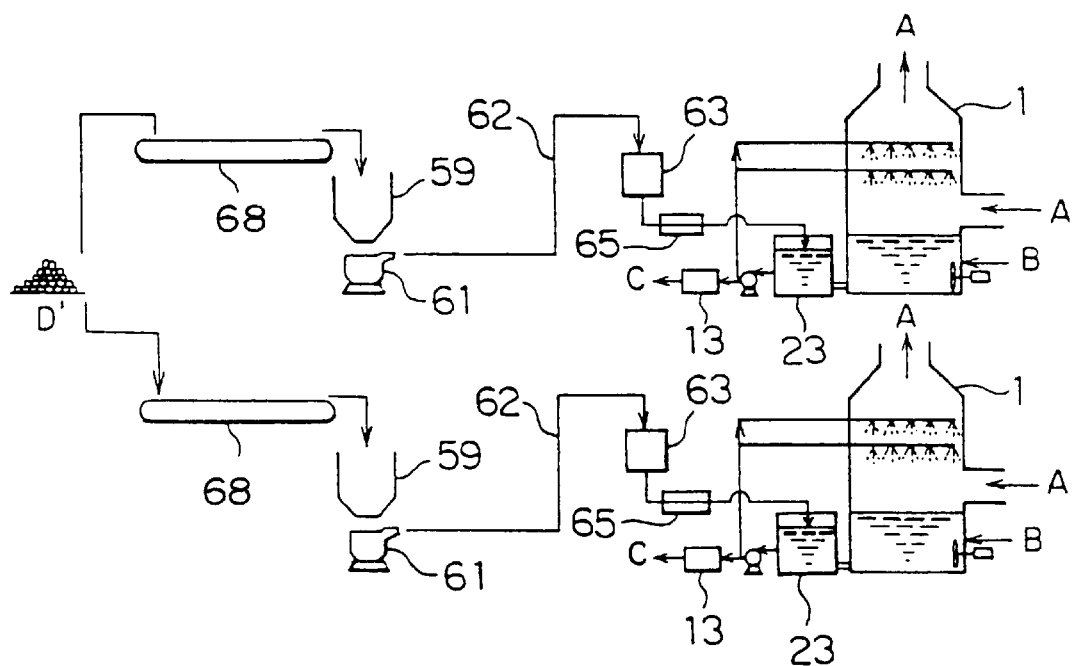
FIG. 37 is an example of a limestone supplying system according to the present invention.

A raw material supply system in which original limestone D' is supplied to a hopper 59 and then to a grinder 61 located near the flue gas desulfurization plant by means of a belt conveyor 68 and, after grinding, is fed through a limestone delivery pipe 62 to a neutralizing unit 23 through a hopper 63 and a fixed quantity feeder 65 is shown in FIG. 37. Another raw material supplying system in which original limestone rock D' is supplied to a hopper 59 and then to a grinder 61 is placed near the site of original limestone D' and, after grinding, is fed by means of a belt conveyor 68 to a neutralizing unit 23 through a hopper 63 and through a fixed quantity feeder 65 located near the desulfurization tower 1 is shown in FIG. 38. In either delivery system, it is not necessary to provide grinders 61 equal in number to the total number of the desulfurization towers 1; rather, it is possible to have one grinder 61 serve a plurality of desulfurization towers 1. Particularly in the system shown in FIG. 38, limestone D can be supplied to all desulfurization towers 1 by placing only one grinder 61 near the site of original limestone quarry D'.

Figure 38:
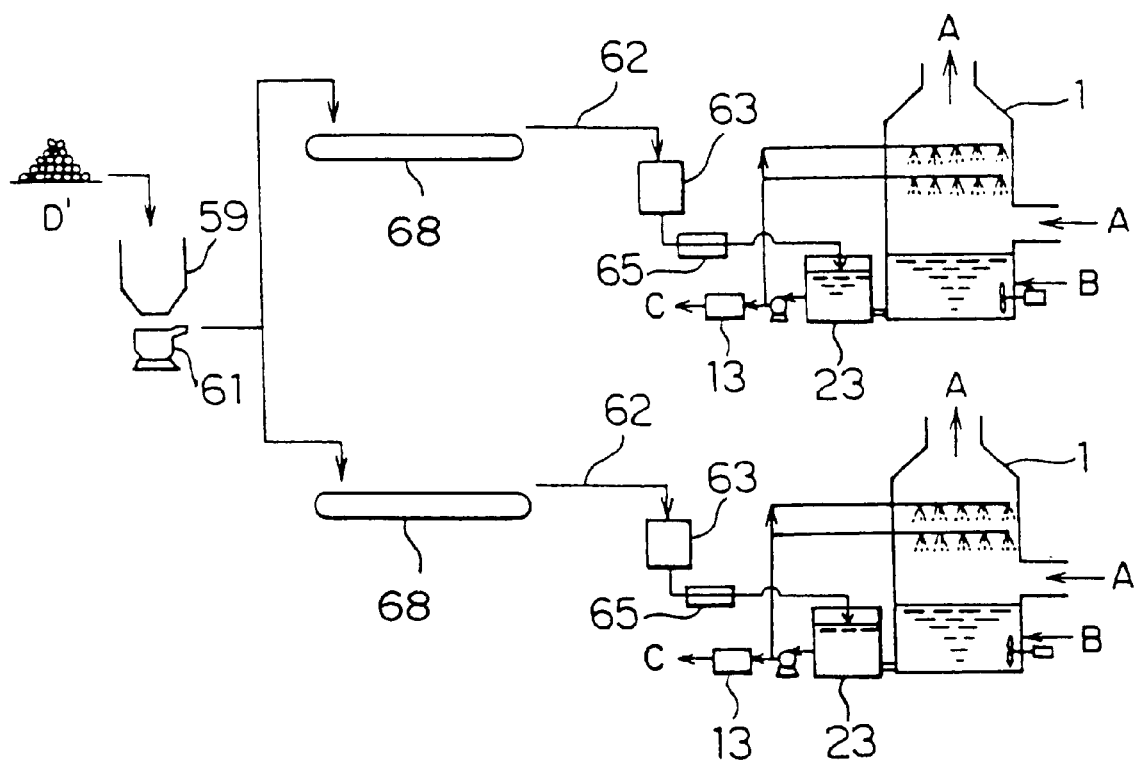
FIG. 38 is an another example of a limestone supplying system according to the present invention.

While FIGS. 37 and 38 show examples in which the neutralizing unit 23 is arranged independently from the desulfurization tower 1, it is apparent that the present invention is not restricted by these examples. The exhaust gas A is thus absorbed by the absorbing liquid in the desulfurization tower 1, is then oxidized by air B and finally gypsum C is collected by means of a hydroextractor 13.

The amount of limestone D supplied to the neutralizing unit 23 is controlled by the fixed quantity feeder 65 or an on-off operation of the grinder 61, and particle size of the limestone is controlled by changing the speed of the grinder.

In the above examples, limestone is selectively left in the neutralizing zone due to a difference in the rate of settling caused by the difference in particle diameters between the limestone D and gypsum C, but these components may also be separated, for example, by means of a mesh or by applying a difference in inertia force and the like.

Although most of the examples described above provide structure in which the exhaust gas A is introduced from a bottom or lower portion of the desulfurization tower 1 and exhausted from an upper portion thereof and a desulfurization tower in which the absorbing liquid is sprayed into the exhaust gas A by spray nozzles, the present invention is effective independently of flow direction of the exhaust gas A and the manner of contact between the exhaust gas A and the absorbing liquid (such as a wetted-wall absorbing unit, a system for bubbling the exhaust gas into the absorbing liquid through a pipe dipped therein, etc.).

According to the present invention, coexistence of Al and F in the absorbing liquid seldom reduces the desulfurizing performance as has been described above.

Further, grinding of a solid desulfurizing agent is not necessary because an agent such as limestone of a coarse particle diameter is used. Gypsum particles (20 to 100 μm in general) are easily separated from the solid desulfurizing agent because of the coarse particle size thereof (diameter more than 0.5 mm, preferably more than 1 mm). Higher desulfurizing performance can be obtained because of an increased amount of the solid desulfurizing agent in the neutralizing zone and quality of the solid products of reaction is improved because the solid desulfurizing agent is not mixed with the particles of the solid products such as gypsum.

What is claimed is:

1. A wet-type flue gas desulfurization plant for removing sulfur oxides from an exhaust gas, said apparatus comprising:

contact means for contacting the exhaust gas with water-containing absorbent in an absorbing zone to absorb the sulfur oxides and thereby form an acidic water-containing liquid;

neutralization means, including a bed of desulfurizing agent particles within a neutralizations zone, for contacting the acidic water-containing liquid with the desulfurizing agent particles to regenerate the water-containing absorbent, the particles of said desulfurizing agent having a weight average particle diameter of at least 0.5 mm;

recirculating means for recirculating at least one portion of the regenerated water-containing absorbent, separated from the desulfurizing agent particles, to the absorbing zone for use in said contacting while leaving the desulfurizing agent particles within said neutralizing zone.

2. A plant according to claim 1 wherein the sulfur oxides dissolve in the water-containing absorbent in the absorbing zone to form sulfurous acids or salts thereof and further comprising oxidation means for contacting the water-containing absorbent with an oxygen-containing gas to oxidize the sulfurous acids or salts thereof to sulfuric acid or salts thereof.

3. A plant according to claim 1 wherein said contact means comprises spray heads for spraying the water-containing absorbent into contact with the exhaust gas.

4. A plant according to claim 1 wherein said contact means comprises a grid.

5. A plant according to claim 1 wherein said contact means comprises dip pipes extending into a pool of said water-containing absorbent for bubbling the exhaust gas therethrough.

6. A plant according to claim 1 wherein said recirculating means includes separating means in an upper portion of said neutralization means and a duct. providing communication between said upper portion of said neutralization means and the absorbing zone.

7. A plant according to claim 1 wherein said absorbing zone is an upright exhaust gas flow path in which the exhaust gas is introduced from a lower portion and exhausted from an upper portion, or the exhaust gas is introduced from the upper portion and exhausted from the lower portion or said absorbing zone is a horizontal exhaust gas flow path in which the exhaust gas does not flow vertically.

8. A plant according to claim 1 further comprising a hydroextractor for treating another portion of the regenerated water-containing absorbent and for recovering products of reaction of the absorbed sulfur oxides and the desulfurizing agent as solid products.

9. A plant according to claim 1 wherein the desulfurization agent particles are limestone.

10. A plant according to claim 1 wherein said desulfurization agent particles have a weight average particle diameter of at least 1.0 mm.

* * * * *

UNITED STATES PATENT AND TRADEMARK OFFICE
CERTIFICATE OF CORRECTION

PATENT NO. : 6,080,370
DATED : June 27, 2000
INVENTOR(S) : Kikkawa et al.

It is certified that error appears in the above-identified patent and that said Letters Patent is hereby corrected as shown below:

Column 7,
Line 4, delete "or" insert -- of --; and
Line 42, "$H_2SO_3Ca(HSO_3)_2$" should read -- $H_2SO_3 = Ca(HSO_3)_2$ --.

Column 8,
Line 43, "absorb-ng" should read -- absorbing --.

Column 10,
Line 45, "A–A" should read -- A. A --.

Column 16,
Line 45, "2" should read -- B --.

Column 17,
Line 50, "$H_2SO_3+1/2O_2=H_2SO_4=_2H+SO_4^{2-}$" should read -- $H_2SO_3 + 1/2O_2 = H_2SO_4 = 2H^+ + SO_4^2$ --.

Column 18,
Line 13, "Åm" should read -- μm --.

Column 19,
Line 39, "13" should read -- 19 --.

Column 23,
Line 7, after "vol." insert -- % --.

UNITED STATES PATENT AND TRADEMARK OFFICE
CERTIFICATE OF CORRECTION

PATENT NO. : 6,080,370
DATED : June 27, 2000
INVENTOR(S) : Kikkawa et al.

It is certified that error appears in the above-identified patent and that said Letters Patent is hereby corrected as shown below:

Column 27,
Line 19, "duct." should read -- duct --.

Signed and Sealed this

Twenty-seventh Day of November, 2001

Attest:

*Nicholas P. Godici*

NICHOLAS P. GODICI
*Attesting Officer*    *Acting Director of the United States Patent and Trademark Office*